(12) United States Patent
Blank et al.

(10) Patent No.: US 12,535,435 B2
(45) Date of Patent: Jan. 27, 2026

(54) MICROWAVE QUANTUM DEVICE

(71) Applicant: Technion Research & Development Foundation Limited, Haifa (IL)

(72) Inventors: Aharon Blank, Haifa (IL); Alexander Sherman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 1023 days.

(21) Appl. No.: 17/529,399

(22) Filed: Nov. 18, 2021

(65) Prior Publication Data

US 2022/0155243 A1 May 19, 2022

Related U.S. Application Data

(60) Provisional application No. 63/115,692, filed on Nov. 19, 2020.

(51) Int. Cl.
*G01N 22/00* (2006.01)
*G01S 7/02* (2006.01)
*H04B 10/70* (2013.01)

(52) U.S. Cl.
CPC ............ *G01N 22/00* (2013.01); *G01S 7/02* (2013.01); *H04B 10/70* (2013.01)

(58) Field of Classification Search
CPC ............ H01S 1/02; G01N 22/00; H04B 10/70
See application file for complete search history.

(56) References Cited

U.S. PATENT DOCUMENTS

| 2014/0077231 | A1* | 3/2014 | Twitchen | C30B 29/64 423/446 |
|---|---|---|---|---|
| 2017/0077665 | A1* | 3/2017 | Liu | H01S 1/005 |
| 2021/0054526 | A1* | 2/2021 | Lew | C30B 31/20 |
| 2021/0091526 | A1* | 3/2021 | Breeze | H01S 1/02 |

OTHER PUBLICATIONS

Floch et al., "Towards achieving strong coupling in three-dimensional-cavity with solid state spin resonance," J. Appl. Phys. 119, 153901 (2016). (Year: 2016).*
Rogers et al., "All-Optical Initialization, Readout, and Coherent Preparation of Single Silicon-Vacancy Spins in Diamond," Phys. Rev. Lett. 113, 263602 (2014). (Year: 2014).*
Blank et al. "Toward Maser Action at Room Temperature by Triplet-Radical Interaction and Its Application to Microwave Technology", RIKEN Review, 44: 128-130, Feb. 2002.
Blank et al. "Applications of Photoinduced Electron Spin Polarization at Room Temperature to Microwave Technology", Applied Physics Letters, 79(11): 1694-1696, Published Online Sep. 5, 2001.
Breeze et al. "Continuous-Wave Room-Temperature Diamond Maser", Nature, 555(7697): 493-496, Mar. 21, 2018.

(Continued)

*Primary Examiner* — Yuqing Xiao
*Assistant Examiner* — Zhengqing Qi

(57) ABSTRACT

A microwave device comprises: a cavity containing a crystal having paramagnetic defects, and being responsive to light; a magnetic field source for applying magnetic field to the cavity and the crystal; and a light source for generating a pump light beam directed to the crystal and having a frequency selected to induce inversion of spin energy levels of the crystal.

20 Claims, 10 Drawing Sheets

(56) References Cited

OTHER PUBLICATIONS

Collier et al. "An X-Band Electron Spin Resonance Spectrometer With A Ruby Maser Preamplifier", Journal of Physics E: Scientific Instruments, 2(1): 607-610, Jun. 1968.

Ditchfield "Noise Limits of A Maser System", Solid-State Electronics, 4: 171-188, Oct. 1962.

Drake et al. "Influence of Magnetic Field Alignment and Defect Concentration on Nitrogen-Vacancy Polarization in Diamond", New Journal of Physics, 18: 013011-1 -13011-8, Published Online Dec. 24, 2015.

Hsu et al. "Optical Pumping of Microwave Masers", Proceedings of the IEEE, 51(1): 185-189, Jan. 1963.

Jones et al. "Single Microwave Photon Detection in the Micromaser", Journal of Physics B: Atomic, Molecular and Optical Physics, 42(14): 145501-1-145501-5, Jun. 17, 2009.

Lamas-Linares et al. "Experimental Quantum Cloning of Single Photons", Science, 296(5568): 712-714, Published Online Mar. 28, 2002.

Lewis "An Introduction to Frequency Standards", Proceedings of the IEEE, 79(7): 927-935, Jul. 1991.

Sabisky et al. "Solid-State Optically Pumped Microwave Masers", IEEE Journal of Quantum Electronics, 3(7): 287-295, Jul. 1967.

Siegman et al. "Microwave Solid-State Masers", Physics Today, 17(10): 65-66, Oct. 1964.

Yang et al. "Realization of Universal Quantum Cloning With Superconducting Quantum-Interference Device Qubits in A Cavity", Physical Review A, 77: 034302-1-034302-4, Mar. 18, 2008.

Yuen et al. "Telecommunications Technology Development for the Deep Space Network", Acta Astronautica, 25(1): 51-60, Jan. 1991.

Barry et al. "Sensitivity Optimization for NV-Diamond Magnetometry", Reviews in Modern Physics, 92(1): 015004-1-015004-68, Mar. 31, 2020.

Benninghoven "Chemical Analysis of Inorganic and Organic Surfaces and Thin Films by Static Time-of-Flight Secondary Ion Mass Spectrometry (TOF-SIMS)", Angewandte Chemie, International Edition in English, 33(10): 1023-1043, Jun. 6, 1994.

Clevenson et al. "Broadband Magnetometry and Temperature Sensing With A Light-Trapping Diamond Waveguide", Nature Physics, 11(5): 393-397, Published Online Apr. 6, 2015.

Doherty et al. "The Nitrogen-Vacancy Colour Centre in Diamond", Physics Reports, 528(1): 1-45, Jul. 1, 2013.

Drake "Characterizing and Modeling Spin Polarization From Optically Pumped Nitrogen-Vacancy Centers in Diamond at High Magnetic Fields", A Dissertation Submitted in Partial Satisfaction of the Requirements for the Degree of Doctor of Philosophy in Chemical Engineering, Graduate Division of the University of California, Berkeley, p. 1-142, Fall 2016.

Fuchs et al. "Excited-State Spectroscopy Using Single Spin Manipulation in Diamond", Physics Review Letters, 101(11): 117601-1-117601-4, Published Online Sep. 12, 2008.

Howarth et al. "Generalization of the Lineshape Useful in Magnetic Resonance Spectroscopy", Journal of Magnetic Resonance, 161(2): 215-221, Apr. 2003.

Jin et al. "Proposal for A Room-Temperature Diamond Maser", Nature Communications, 6: 8251-1-8251-8, Sep. 23, 2015.

Loretz et al. "Optical Hyperpolarization of Nitrogen Donor Spins in Bulk Diamond", Physical Review B, 95(6): 064413-1-064413-7, Feb. 14, 2017.

Oxborrow et al. "Room-Temperature Solid-State Maser", Nature, 488(7411): 353-356, Aug. 16, 2012.

Reddy et al. "Two-Laser Spectral Hole Burning in A Colour Centre in Diamond", Journal of Luminescence, 38(1-6): 46-47, Dec. 1987.

Shtirberg et al. "High-Sensitivity Qband Electron Spin Resonance Imaging System With Submicron Resolution", The Review of Scientific Instruments, 82(4): 043708-1-043708-12, Apr. 2011.

Stoll et al. "Atomic Hydrogen as High-Precision Field Standard for High-Field EPR", Journal of Magnetic Resonance, 207(1): 158-163, Published Online Aug. 13, 2010.

Tetienne et al. "Magnetic-Field-Dependent Photodynamics of Single NV Defects in Diamond: An Application to Qualitative All-Optical Magnetic Imaging", New Journal of Physics, 14: 103033-1-103033-16, Oct. 19, 2012.

Tseitlin et al. "Uncertainty Analysis for Absorption and First Derivative Electron Paramagnetic Resonance Spectra", Concepts in Magnetic Resonance, Part A: Bridging Education and Research, 40A(6): 295-305, Nov. 2012.

\* cited by examiner

MICROWAVE QUANTUM DEVICE

RELATED APPLICATION

This application claims the benefit of priority of U.S. Provisional Patent Application No. 63/115,692 filed on Nov. 19, 2020, the contents of which are incorporated herein by reference in their entirety.

FIELD AND BACKGROUND OF THE INVENTION

The present invention, in some embodiments thereof, relates to a microwave device and, more particularly, but not exclusively, to an optically pumped microwave device.

Amplification and detection of microwave signals with minimal addition of noise is useful for a variety of applications. For example, deep-space communication, radio astronomy, radar, and microwave spectroscopy. In all of these applications, the signal of relevance is very weak, sometimes in the level of a few 100s of microwave photons per second, and thus, any noise added to the signal during the amplification process might overwhelm it and eliminate the possibility of detecting it efficiently.

Three types of amplifiers that are known for amplifying microwave signals with low addition of noise. A first type includes conventional electronic amplifiers, mainly based on high-electron-mobility transistors (HEMTs).

A second type includes amplifiers based on superconducting circuits, these include the families of microwave SQUIDs (superconducting quantum interference devices), radio frequency (RF) single electron transistor, and quantum Josephson parametric amplifier. These amplifiers make use of a variety of non-linear phenomenon occurring in superconductors to amplify microwave signal with quantum-limited noise performance (e.g. adding 0.5 photon of noise in non-degenerate mode and 0 photons in degenerate mode).

A third type of amplifiers includes solid-state MASERS (microwave amplification by stimulated emission of radiation). Such amplifiers rely on paramagnetic species, mainly ions embedded in a crystal, for example, Rubi ($Cr^{3+}$ in a crystal of $Al_2O_3$). Under external static magnetic field, there are four energy levels for the unpaired electrons of this paramagnetic ion. Using microwave pumping, one can reach a state of population inversion (when there are more electrons in higher energy level than in a lower energy level). Under such state, incoming microwave radiation causes stimulated emission of additional microwave radiation—namely amplification of the incoming signals.

Recently [Nature volume 555, pages 493-496 (2018)], room temperature solid-state MASER operation, based on color centers (called negatively-charged Nitrogen-Vacancy, $NV^-$, defects) in diamond, was used as a microwave source.

Additional background art includes PHYSICAL REVIEW A77, 034302, 2008; Science 26 Apr. 2002: Vol. 296, Issue 5568, pp. 712-714; and New Journal of Physics 18, 013011 (2015).

SUMMARY OF THE INVENTION

According to an aspect of some embodiments of the present invention there is provided a microwave device. The device comprises: a cavity containing a crystal having paramagnetic defects, and being responsive to light; a magnetic field source for applying magnetic field to the cavity and the crystal; and a light source for generating a pump light beam directed to the crystal and having a frequency selected to induce inversion of spin energy levels of the crystal.

According to some embodiments of the invention the device is configured to operate at any frequency within the frequency range spanning from about 1 GHz to about 100 GHz. According to some embodiments of the invention the device is configured to operate at any frequency within the X frequency range.

According to some embodiments of the invention the cavity is characterized by a quality factor of from about 100 to about 5000.

According to some embodiments of the invention the dimensions and shapes of the cavity and the crystal are is selected such that a filling factor associated with a secondary magnetic field generated by microwave radiation resulting from the inversion is from about 0.3 to about 0.8.

According to some embodiments of the invention the crystal is diamond. According to some embodiments of the invention the diamond has a have [1 1 1] orientation. According to some embodiments of the invention the paramagnetic defects comprise nitrogen impurities. According to some embodiments of the invention a concentration of nitrogen vacancy centers within the diamond is from about 0.4 ppm to about 50 ppm.

According to some embodiments of the invention the paramagnetic defects are at concentration selected to ensure a an effective transverse relaxation time, $T_2^*$, of from about 25 ns to about 50 ns, and a spin-lattice relaxation time, $T_1$, of from about 2 ms to about 5 ms.

According to some embodiments of the invention the paramagnetic defects are at a concentration of at least 150 ppm.

According to some embodiments of the invention the cavity is a dielectric cavity.

According to some embodiments of the invention the cavity comprises a metal. According to some embodiments of the invention the device is devoid of any dielectric resonator between the crystal and in internal wall of the cavity.

According to some embodiments of the invention the device serves as a frequency source, and has an optical port receiving the pump beam, and an output port for emitting an output beam generated within the cavity.

According to some embodiments of the invention the device serves as a quantum amplifier, and has an optical port receiving the pump beam, a microwave port receiving an input microwave which passes through the inverted population and is amplified, and an output port through which the amplified microwave is emitted.

According to an aspect of some embodiments of the present invention there is provided a radar. The radar comprises the device as delineated above and optionally and preferably as further detailed below.

According to an aspect of some embodiments of the present invention there is provided a communication system. The communication system comprises the device as delineated above and optionally and preferably as further detailed below.

According to an aspect of some embodiments of the present invention there is provided a system for detecting a quantum state of a photon. the system comprises an optical system having a first optical path and a second optical path and being configured to receive the photon and direct it to one of the optical paths. Each of the optical paths optionally and preferably comprises a device, as delineated above and optionally and preferably as further detailed below, that amplifies a photon propagating in the respective optical path, thereby providing a multiplicity of photons each having the same quantum state. Each optical path can also include a detector for detecting the multiplicity of photons, thereby detecting the state of the photon.

According to an aspect of some embodiments of the present invention there is provided a method of quantum mechanically amplifying a signal, comprising directing the signal to the device as delineated above and optionally and preferably as further detailed below, and directing a pump light beam to the crystal, thereby quantum mechanically amplifying the signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

In FIG. 1B, an NV$^-$ center enriched diamond crystal is used as a gain medium and placed inside a MW cavity. Population inversion is attained by optical illumination (520 nm in experiments performed by the Inventors) via an aperture in the cavity. The MW photons are fed into and extracted from the cavity via two separate MW input and output ports. An electromagnet is used in order to maintain a static magnetic field (denoted as $B_0$) corresponding to the desired resonance transition, as dictated by the energy splitting diagram depicted in FIG. 1A.

FIG. 2A is an image of a D10 diamond, FIG. 2B is an image of a D15 diamond, FIG. 2C is an image of a D100 diamond, FIG. 2D is an image of a D101 diamond, and FIG. 2E is an image of a D301 diamond.

DESCRIPTION OF SPECIFIC EMBODIMENTS OF THE INVENTION

Figure 1A:
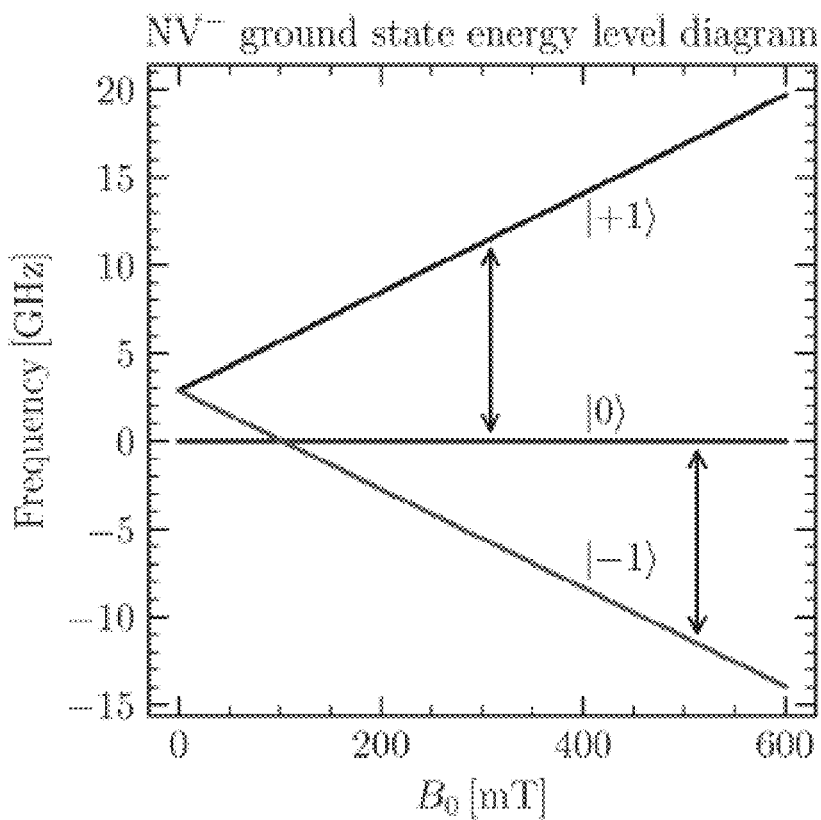
FIGS. 1A and 1B show NV$^-$ center ground state energy level diagram (FIG. 1A) and a typical possible setup of a diamond-based maser amplifier using an NV$^-$ center enriched diamond crystal as a gain medium, placed inside a MW cavity (FIG. 1A). The NV$^-$ center ground state energy level diagram, is presented in units of frequency, as a function of magnetic field, where the magnetic field is aligned along the NV$^-$ axis. The |+1>, |0>, and |−1> energy levels are plotted. Allowed transitions at f=11.5 GHz are indicated by black up-down arrows.

The present invention, in some embodiments thereof, relates to a microwave device and, more particularly, but not exclusively, to an optically pumped microwave device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments provide a microwave device which can be used as a quantum amplifier or as a frequency source. The microwave device of the present embodiments can be configured to operate at any frequency within the frequency range spanning from about 1 GHz to about 100 GHz. In some embodiments of the present invention the microwave device is configured to operate at the X frequency range (for example, from about 8 GHz to about 12 GHz). In other embodiments, the microwave device is configured to operate at a frequency within the frequency range spanning from about 1 GHz to about 8 GHz, or the frequency range spanning from about 12 GHz to about 100 GHz.

In an experiment performed by the Inventor of the present invention, a prototype microwave device operating at a frequency of about 35 GHz has been fabricated.

Figure 15:
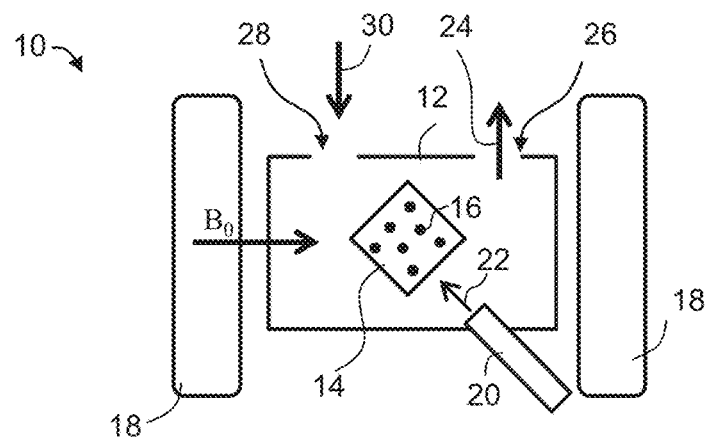
FIG. 15 is a schematic illustration of a microwave device, according to some embodiments of the present invention.

FIG. 15 is a schematic illustration of a microwave device 10, according to some embodiments of the present invention. Device 10 comprises a cavity 12 containing a crystal 14 having paramagnetic defects 16 and being responsive to light.

Cavity 12 serves as a resonator, and the Inventor of the present invention found that the operating frequency of device 10 can be adjusted by judicious selection of the size of the cavity. The size of the cavity can be selected according to a linear rescaling principle. For example, a microwave device operating at a frequency f can be fabricated using a cavity having twice the linear dimensions of a cavity of a microwave device operating at a frequency of 2f (1 GHz≤f≤2f≤100 GHz).

In some embodiments of the present invention cavity 12 is cylindrical, but other shapes for cavity 12 are also contemplated. Cavity 12 is preferably dielectric. For example, cavity 12 can be selected to encase a $TE_{01\delta}$ resonance mode of microwave radiation. Alternatively, cavity 12 can be a metallic cavity. In some embodiments of the present invention cavity 12 is made of a combination of metallic and dielectric parts. In embodiments in which cavity 12 is a metallic cavity, or a cavity that is made of a combination of metallic and dielectric parts, device 10 is optionally and preferably devoid of any dielectric resonator that encompasses crystal 14 from 360°, between crystal 14 and the internal wall of cavity 12.

In some embodiments of the present invention cavity 12 is characterized by a quality factor Q of from about 100 to about 5000, more preferably from about 100 to about 2000, more preferably from about 500 to about 2000, more preferably from about 500 to about 1500.

The quality factor Q is defined as ratio between the resonance frequency and the resonance bandwidth (full width at half maximum of the resonance curve) of cavity 12. For example, a quality factor Q of 1000 can be ensured by constructing a cavity that provides a resonance frequency of f and a resonance bandwidth of 0.001f.

In some embodiments of the present invention crystal 14 comprises a diamond. In these embodiments, the diamond has a [1 1 1] crystallographic orientation of its large faces. This is in distinction with previous maser-related works that made use of the [1 0 0] orientation, which is more common and easily available from synthetic diamond manufacturers. The Inventor found that the [1 0 0] orientation is not suitable for practical masers, since it results in a filling factor which is too small to allow quantum amplification.

In embodiments in which the crystal comprises diamond, the paramagnetic defects 16 preferably comprise nitrogen impurities. Such defects are also referred to in the literature as called nitrogen vacancy (NV) centers. Each defect typically comprises a negatively charged substitutional nitrogen that replaces one of the diamond crystal lattice's carbon atoms, and a vacancy adjacent to the excluded carbon atom.

The concentration of the paramagnetic defects 16 (e.g., of the nitrogen impurities, when crystal 14 is a diamond) is optionally and preferably selected to ensure that the quality factor Q of cavity 12 is within one of the aforementioned ranges. The Inventor found that it is preferred select the concentration of defects 16 such as to ensure electron spin resonance (ESR) in the crystal 14 with an effective transverse relaxation time, $T_2^*$, of from about 25 ns to about 50 ns, more preferably from about 25 ns to about 45 ns, more preferably from about 28 ns to about 45 ns. This allows for relatively large instantaneous bandwidth for amplification of from about 1 MHz to about 100 MHz.

Herein "instantaneous bandwidth" means a bandwidth that is maintained for substantially the same (e.g., with tolerance of less than 10%) for any central microwave wavelength.

The $T_2^*$ values of the present embodiments are significantly shorter than conventional systems in which the effective transverse relaxation time is of from 0.5 µs to more that 10 µs, resulting in source bandwidth of from about 300 kHz to a few kHz.

In various exemplary embodiments of the invention the concentration of the paramagnetic defects 16 is also selected to ensure an ESR in the crystal 14 with a spin-lattice relaxation time, $T_1$, of from about 2 ms to about 5 ms, more preferably from about 2 ms to about 4 ms. The advantage of these embodiments is that they improve the gain of device 10, and reduce the level of optical power that effects population inversion pumping.

Typical defect concentrations (e.g., concentration of nitrogen substitutions) suitable for the present embodiments are at least 150 ppm, more preferably at least 160 ppm, more preferably at least 170 ppm, more preferably at least 180 ppm, more preferably at least 190 ppm, more preferably at least 200 ppm. Typical concentration of nitrogen vacancy centers is from about 0.4 ppm to about 3.5 ppm. Also contemplated, are embodiments in which the concentration of nitrogen vacancy centers is above 3.5 ppm, e.g., up to about 50 ppm.

Device 10 also comprises a magnetic field source 18 for applying a static magnetic field $B_0$ to cavity 12 and crystal 14. Magnetic field source 18 can be a permanent magnet or an electromagnet. When crystal 14 comprises a diamond with a [1 1 1] crystallographic orientation of its large faces, the diamond is oriented such that the [1 1 1] direction is aligned with the direction of the field $B_0$. The strength of the magnetic field depends on the application in which device 10 is employed. Typical magnetic field strengths suitable for the present embodiments include, without limitation, from about 120 mT to about 3.5 T.

Device 10 also comprises a light source 20 for generating a pump light beam 22 directed to crystal 14 and having a frequency selected to induce inversion of spin energy levels of crystal 14. For example, when crystal 14 is a diamond, light beam 22 can be a green light (e.g., wavelength centered at about 520 nm). Light source can be of any type, such as, but not limited to, a laser light source, a light emitting diode, or the like.

The inversion of spin energy levels generates microwave radiation 24 (e.g., maser) that can be output via an output port 24. The central frequency of microwave radiation 24 depends on the central frequency of cavity 12 and the strength of the static magnetic field $B_0$ provided by source 18. The microwave radiation 24 induces a rotating secondary magnetic field $B_1$ (not shown) that, together with the static magnetic field $B_0$, generate the aforementioned ESR phenomenon. The ratio between the square modulo of the component of the secondary magnetic field $B_1$ that is tangential to the direction of the static field, $B_0$, integrated over the volume of crystal 4, and the square modulo of $B_1$ over the entire volume of cavity 12 is referred to as the filling factor, and is denoted by the Greek letter η.

Preferably, the dimensions of cavity 12 and the magnetic field strength provided by source 18 are selected such that a ratio between the frequency and the bandwidth of microwave radiation 24, substantially matches (e.g., with tolerance of less than 30% or less than 20% or less than 10%) the value $1/(\pi T_2^*)$, where $T_2^*$ is, as stated, the effective transverse relaxation time of crystal 14.

According to some embodiments of the present invention the dimensions and shapes of cavity 12 and crystal 14 are selected such that the filling factor η associated with the secondary magnetic field $B_1$ is from about 0.3 to about 0.8, more preferably from about 0.5 to about 0.7, more preferably from about 0.6 to about 0.7, e.g., about 0.65. This is substantially larger than conventional systems in which the filling factor is about 0.015.

Device 10 can be employed both as a source of microwave radiation, and as a quantum amplifier. For applications in which device 10 is to be employed as a source of microwave radiation, it is sufficient for device 10 to include a single microwave port 26, which serves as an output port for providing microwave radiation. For applications in which device 10 is to be employed as a quantum amplifier, device 10 also comprises an additional microwave port 28 which serves as an input port for receiving an input microwave signal 30 to be amplified, in which case radiation 24 enacts the amplified signal. Each of ports 26 and 28 can independently be configured as known in the art of microwave radiation. For example, ports 26 and 28 can be provided as microwave antennas, or the like.

Device 10 is preferably configured to amplify a signal of a single microwave photon. Preferably, during the amplification process, the quantum state of the incoming photon is preserved. Specifically, when the incoming photon has a certain quantum state (for example, certain polarization and phase), device 10 composes the amplified signal from additional photons that are likely to have the same quantum state. It is appreciated that not all the photons in the amplified signal can have exactly the same quantum state due to the no-cloning theorem of quantum mechanics. Yet, it was found by the inventors that generating a collection of photons with sufficiently high probability of having the same quantum state as the incoming photon 30 is attainable by the device described herein. While high fidelity quantum amplifiers that operate in the optical regime are known (see, for example, Science 26 Apr. 2002: Vol. 296, Issue 5568, pp. 712-714, supra), no such amplifier for microwave radiation has been demonstrated in the literature.

The device of the present embodiments optionally and preferably complies with the maser equation (see EQ. 1 in the Example section that follows), enjoys properties that are not attainable by other microwave devices. The characteristic bandwidth Δf of the device is from about 1 MHz to about 100 MHz, the gain, G, of the device is from about 15 dB to about 25 dB, and the saturation output power, Ps, of the device is from about 0.1 nW to about 100 nW. The aforementioned gain and saturation power levels are particularly useful for applications in which quantum amplification is desired, since they allow amplifying the signal to a useful level, with relatively small effect on the overall noise performance due to second- and third-stage amplifiers.

The device of the present embodiments can be used in any application in which generation and amplification of microwave radiation is required, including, without limitation, communication (e.g., deep-space communication), radio astronomy, radar, microwave spectroscopy, and the like.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

This Example provides experimental results on a set of parameters affecting diamond maser operation, such as the population and linewidth of the electron spin energy levels of the NVs under light illumination, as well as their relaxation times for several different diamond material compositions. This Example also provides preferred diamond material compositions and crystal geometry suitable for maser-type applications.

Solid-state [1] and gas-phase masers, the microwave analog of lasers, were developed in the 1950s and have been used since in a variety of applications ranging from deep space communications [2] to low-noise amplification of microwave signals in magnetic resonance experiments [3]. Similar to lasers, masers employ an atomic or molecular system with at least 3 quantized energy levels and apply microwave or light pumping methods to achieve population inversion in one of the level pairs. This state inversion can be used either for low-noise signal amplification [4] or as a frequency-stable radiation source [5]. Recently, it has also been suggested that masers could be used for single microwave photon detection [6].

Maser technology can be roughly divided into two categories: gas-phase masers and solid-state masers. The former can operate at room temperature, but due to the low concentration of the active media they serve mainly as a source of microwave radiation and cannot be useful as amplifiers. Solid-state masers can be used as excellent low-noise amplifiers, but the Inventor realized that they have the major drawback of operating only at low cryogenic temperatures (about 1K). Such amplifiers rely on paramagnetic species, mainly ions embedded in a crystal; for example, ruby ($Cr^{3+}$ in a crystal of $Al_2O_3$). Under an external static magnetic field, the unpaired electrons of this paramagnetic ion can be arranged in four energy levels. The use of microwave pumping makes it possible to reach a state of population inversion in which there are more electrons in a higher energy level than in a lower energy level. Under such conditions, incoming microwave radiation stimulates the emission of additional microwave radiation, and therefore amplifies the incoming signals.

Despite the maturity of solid-state maser technology, the requirement of operation in low temperatures greatly limits its widespread use. Over the years, many efforts have been invested in attempts to circumvent this limitation, primarily using optical excitation techniques to create inverted population levels.

Several recent breakthroughs in the field have resulted in room temperature operation of optically pumped solid-state maser systems, in pulsed-mode [11], and in continuous-wave mode [12]. The latter achievement is based on the use of negatively charged nitrogen vacancy ($NV^-$) color centers in diamond single crystals as the active media. Under a static magnetic field, the color center has three distinct energy levels in its ground state.

FIG. 1A illustrates $NV^-$ center ground state energy level diagram, in units of frequency, as a function of magnetic field, where the magnetic field is aligned along one of the $NV^-$ axes. Shown are the |+1>, |0>, and |−1> energy levels. Allowed transitions at f=11.5 [GHz] are indicated by up-down arrows.

Figure 1B:
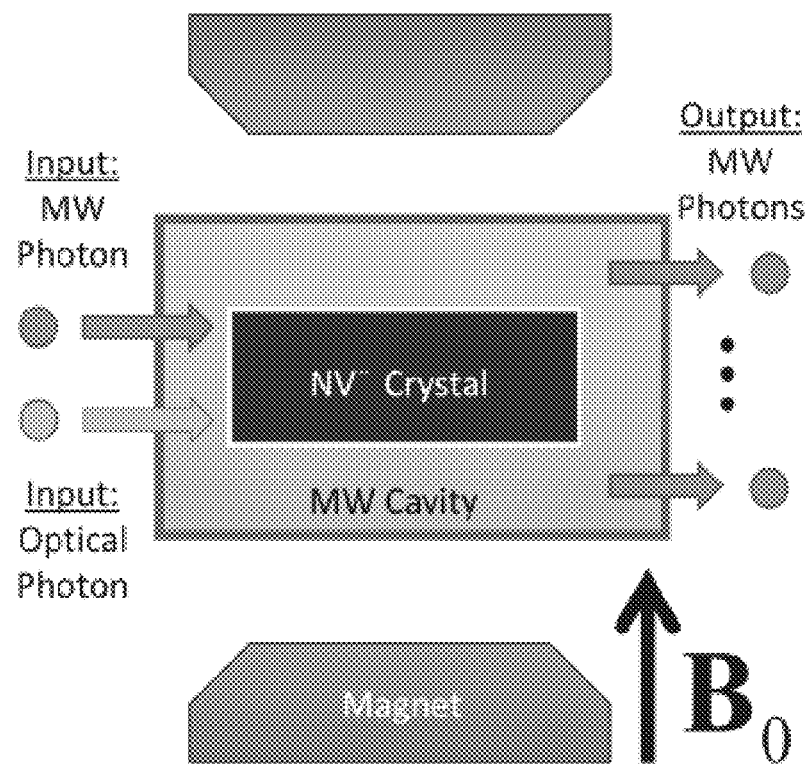
Figure 2A:
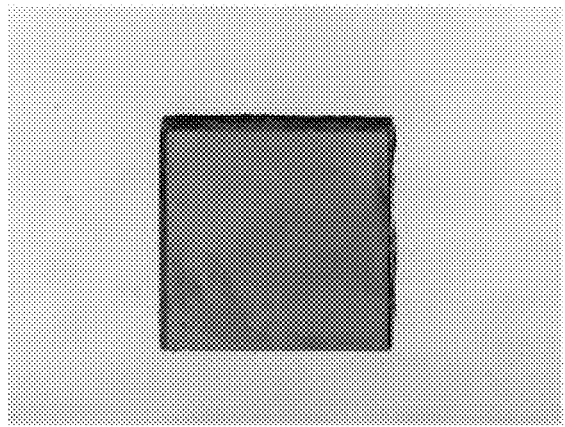
FIGS. 2A-E are images of the diamond samples used in experiments performed according to some embodiments of the present invention, where
Figure 2B:
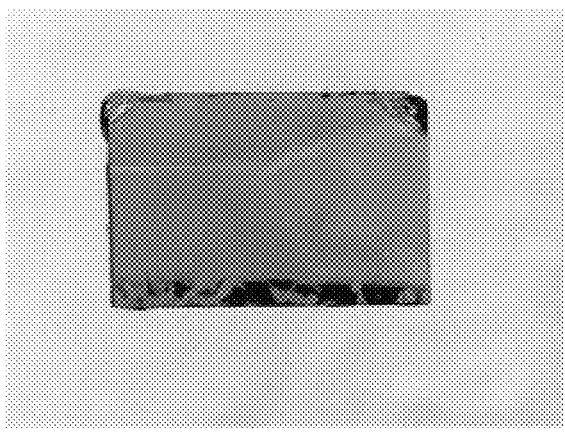
Figure 2C:
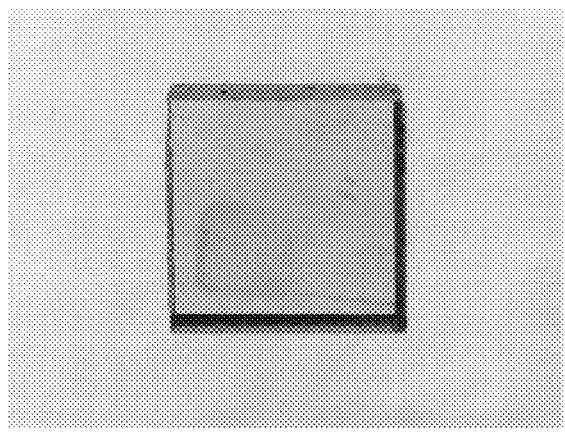
Figure 2D:
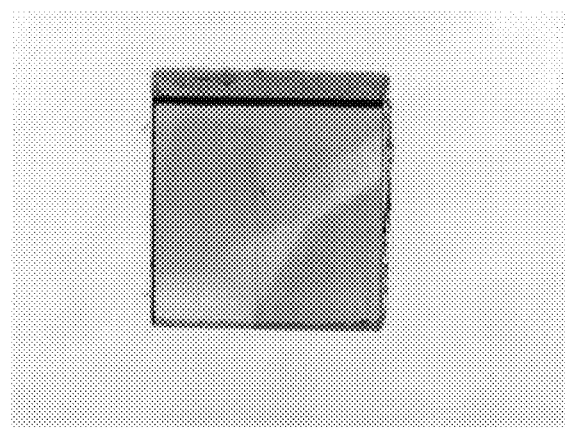
Figure 2E:
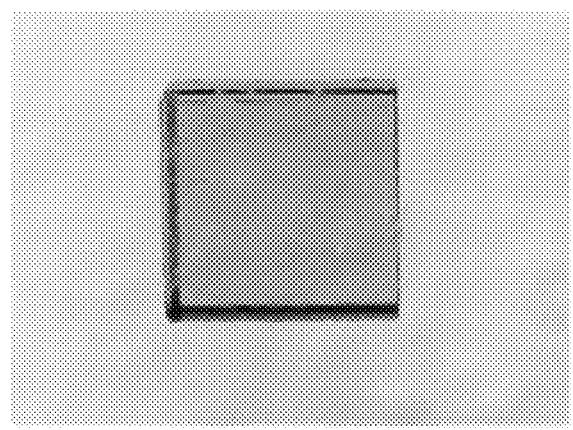

FIG. 1B illustrates a typical possible setup of a diamond-based maser amplifier. An $NV^-$ center enriched diamond crystal is used as a gain medium and placed inside a MW cavity. Population inversion is attained by optical illumination (520 nm in this Example) via an aperture in the cavity. The MW photons are fed into and extracted from the cavity via two separate MW input and output ports. An electromagnet is used in order to maintain a static magnetic field (denoted as $B_0$) corresponding to the desired resonance transition, as dictated by the energy splitting diagram depicted in FIG. 1A.

One of the attributes of this solid-state electron spin system is that upon green light illumination, the population of these energy levels deviates significantly from the Boltzmann equilibrium and most of the spins are found in the |0> level [13]. This effective optical pumping results in population inversion between the |0> and the |−1> levels (under a static field that is larger than about 100 mT), which can be used as basis for the maser operation.

Despite the recent success in operating such diamond-based maser at room temperature, The Inventor found that there are still many gaps in the current approach that prevent it from becoming a useful tool in science and technology, as will now be explained.

The maser threshold equation can be written as [1]:

$$Q_{th} = \frac{\hbar}{\mu_0 g_e^2 \mu_B^2 (T_2^* \Delta n) \eta}. \quad (EQ. 1)$$

EQ. (1) relates to a situation where the maser is based on a cavity that houses the active material (FIG. 1(b)). $Q_{th}$ is related to the threshold value of the cavity's quality factor (including dielectric losses in the diamond material and other dielectric materials in the cavity, ohmic losses from the cavity walls, and coupling losses) beyond which maser action is enabled. The terms h, $\mu_0$, $g_e$ and $\mu_B$ are physical constants (reduced Planck's constant, free space permeability, electron g-factor, and Bohr magneton, respectively), $T_2^*$ represents the inverse spectral linewidth of the NV⁻ energy levels, which is equal to $1/\pi T_2^*$ for a Lorentzian lineshape model, and $\Delta n$ is the population inversion difference, per unit volume, between the upper and lower energy levels of the transition used for maser amplification, and $\eta$ denotes the filling factor and is defined as $$\eta = (\int_{Diamond} |B_1^t|^2 dV)/(\int_{Cavity} |B_1|^2 dV),$$

where the numerator integrates the square modulo of the MW magnetic field component, $B_1$, tangential to the direction of the static field, $B_0$, over the diamond volume, and the denominator integrates the square modulo of $B_1$ over the entire resonator's volume.

Based on EQ. (1), one observes that one option for achieving maser action is to operate the device with an extremely high Q resonator that surpasses the threshold. Indeed, this was the path taken in the recent demonstration of the diamond-based maser device, along with choosing a material that has a relatively small concentration of NV⁻ and accordingly, a relatively long $T_2^*$ [12]. The Inventor found that these choices resulted in two major limitations.

A first drawback is that this maser device is inappropriate for operating in amplification mode, and was only operated as an oscillator. This is due to the device's extremely low saturation power of about 1 pW. The Inventor found that such low power level, which usually characterizes gas rather than the typical solid-state masers, prevents use it as an amplifier. As such, the device's properties resemble those of gas-phase rather than typical solid-state masers.

A second drawback is that instantaneous bandwidth of operation is narrow, since it was limited by both the bandwidth of the high Q resonator (e.g., 300 kHz with Q of about 30000) and the bandwidth of the NV⁻ spins' transitions ($1/\pi T_2^* \approx 0.6$ MHz).

The present Example investigates the properties of diamond materials that may be used to realize an NV⁻-based maser device and correlates them with the expected device's properties. This Example allows maser device designers to choose an optimal diamond material that corresponds to a specific set of desired maser properties (e.g., gain, saturation power, bandwidth, noise, spin-lattice relaxation time ($T_1$), inhomogeneous spin-spin relaxation time ($T_2^*$), and level of light pumping power). This Example provides measurements of material attributes such as nitrogen (N) and NV⁻ concentration, $T_1$, $T_2$, $T_2^*$, and the level of inverted spin energy population vs. light irradiation power. This Example makes use of single crystal diamonds with [1 1 1] crystallographic orientation of their large faces. This is in distinction with previous maser-related works that made use of the [1 0 0] orientation, which is more common and easily available from synthetic diamond manufacturers. The Inventor found that this orientation is not suitable for practical masers for the reasons outlined below.

It is noted that optimization of diamond materials for maser applications shares certain common attributes with the optimization of said materials for magnetic field sensing applications. The latter issue has been covered extensively by a recent review [14]. Nevertheless, as further detailed hereinbelow, a material that is good for magnetometery may be less useful for maser applications and vice versa. Masers require different considerations, as is explained below.

Experimental

In this Example, five types of diamond samples, denoted as D10, D15, D100, D101, and D301 were experimentally analyzed. Their images are shown in FIGS. 2A-E, and their physical description and properties are listed in Table 1.

TABLE 1

| Sample | D10 | D15 | D100 | D101 | D301 |
|---|---|---|---|---|---|
| Source | Element Six | Element Six | Sumitomo Part No. CD1006(111) | Sumitomo Part No. CD1006(111) | Sumitomo Part No. CD1006(111) |
| Size (mm³) | 1 × 1 × 0.32 | 1.46 × 0.99 × 0.3 | 1.05 × 1.05 × 0.57 | 1.05 × 1.05 × 0.57 | 1.05 × 1.05 × 0.57 |
| Orientation | [111] | [111] | [111] | [111] | [111] |
| Preparation method | HPHT | HPHT | HPHT | HPHT | HPHT |
| Electron irradiation energy (MeV) | 10 | 10 | 5 | 5 | 5 |
| Electron irradiation dose (e/cm²) | 5 × 10¹⁸ | 5 × 10¹⁸ | 1 × 10¹⁹ | 1 × 10¹⁹ | 2 × 10¹⁹ |

Continuous Wave (CW) ESR Measurements

X-band CW ESR experiments were performed at room temperature using a commercial Bruker EMX X-band system equipped with a rectangular $TE_{102}$ cavity operating at about 9.5 GHz. The diamond samples were oriented so that one of the NV⁻ center axes (along the [111] direction of the diamond crystal) was aligned with the main static magnetic field. The microwave power incident on the cavity was set to 6.35 μW. ESR spectra were recorded by averaging over 50 scans, each taken with 12 data points per gauss using a conversion time of 41 ms, modulation frequency of 100 kHz, and modulation amplitude of 0.05 mT.

Some of the nitrogen impurities in the diamond single crystal substitute the carbons and generate the so-called P1 paramagnetic color center. In order to estimate the P1 center concentrations of each diamond sample, a specimen of gamma-irradiated hydrogen trapped in Octakis(trimethylsiloxy)silsesquioxane (H@POSS) [15] was used as a reference sample with a known number, $N_{ref} = 4.5 \times 10^{13}$, of unpaired electron spins. This sample provided two stable sharp spectral lines that did not overlap the ones originating in the P1 centers or the NV⁻. To eliminate baseline distortions and increase analysis accuracy [16], the experimental spectra were directly fitted to a sum of Tsallis-based lineshape derivatives [17]. All further analysis was carried out on the resulting fit-derived analytic model. Estimation of the total number of P1 centers was carried out by comparing the double integral of the CW measurement of the P1 center to the H@POSS reference.

Pulsed ESR Measurements

Figure 3:
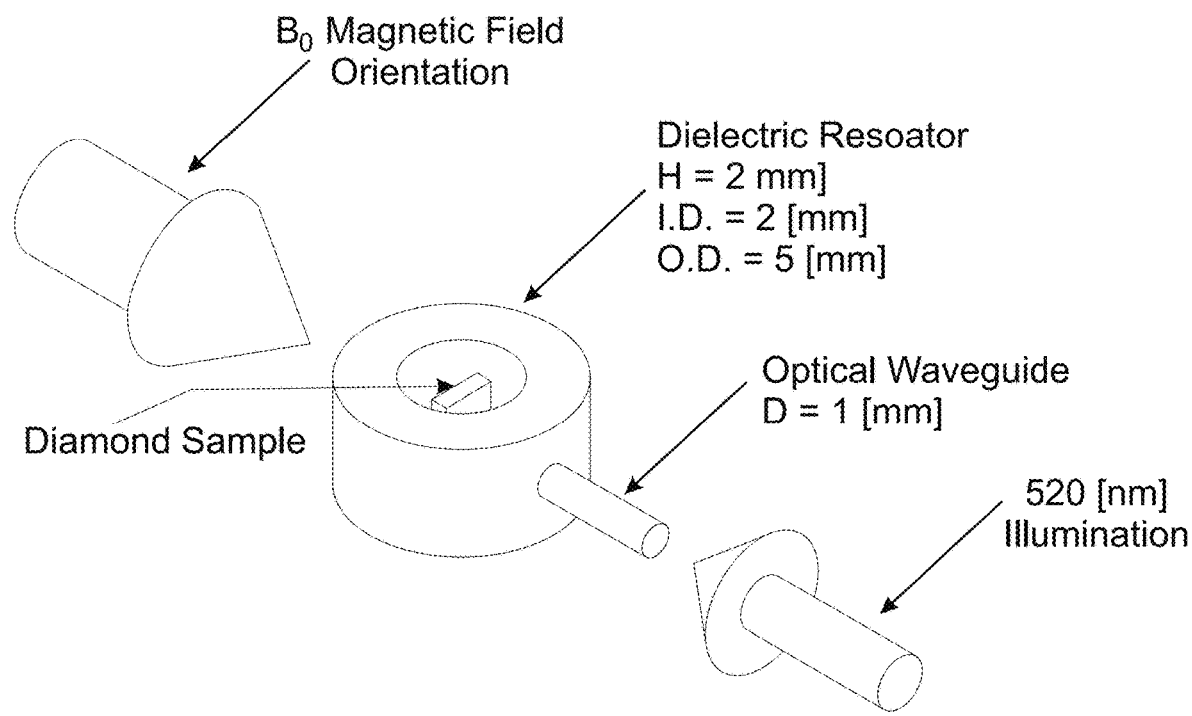
FIG. 3 is a schematic illustration of an experimental setup used in experiments performed according to some embodiments of the present invention to measure pulsed ESR.

Pulsed ESR measurements were performed at room temperature using a customized in-house built pulsed ESR spectrometer operating at the 6-18 GHz range. Details of the spectrometer are provided in Ref. [18]. For the purpose of the present experiments, we developed a custom cylindrical cavity encasing a $TE_{01\delta}$ mode dielectric resonator (FIG. 3) that has a resonance frequency of about 11.5 GHz and Q factor of about 180. A cylindrical optical waveguide with a diameter of 1 mm was used to illuminate the diamond sample by means of a laser diode with a peak emission intensity wavelength of 520 nm (Thorlabs' L520G1). The laser diode was collimated into the cylindrical waveguide used to illuminate the diamond sample trough an aperture in the dielectric resonator (Trans-Tech's 8300 Series), as illustrated in FIG. 3.

The diamond samples were oriented so that one of the $NV^-$ center axes (along the [111] direction of the diamond crystal) was aligned with the static magnetic field. The filling factor for a typical $1 \times 1 \times 0.3$ [mm$^3$] sample was calculated to be about 0.01. The Inventor typically employed MW pulses that are 40 ns long with peak power of about 1 W and a repetition frequency of about 200 Hz. This resulted in an MW power in the cavity of abut 7 µW.

The pulsed ESR spectrometer has the capability to record both the in-phase and the quadrature components of the ESR signal. In order to eliminate baseline distortions, timing, and sampling-induced errors, both the in-phase and the quadrature time-domain components were fitted to an analytic model defined in EQ. (2)

$$\Theta(A, t, t_0, q, W, \omega, \phi, m, n) = A \cdot T(t, t_0, q, W) \cdot \cos(\omega(t-t_0)+\phi)+m \cdot t+n, \quad \text{(EQ. 2)}$$

where $T(t, t_0, q, W)$, reproduced in EQ. (3), is the Tsallis-based lineshape defined in Ref. [17]:

$$T(t, t_0, q, W) = \left(1 - (2^{q-1}-1)\left(\frac{t-t_0}{W}\right)^2\right)^{\frac{1}{1-q}}. \quad \text{(EQ. 3)}$$

In EQs. 2 and 3, W is the half-width at half-height of the Tsallis lineshape, $t_0$ is the lineshape's temporal center at which $T(t=t_0, t_0, q, W)=1$, m and n are the baseline slope and offset, and $q \in (1, \infty)$ is a lineshape parameter so that in the range $q \in (1,3)$ the lineshape's integral is bound ($\int T(t, t_0, q, W) dt < \infty$).

Measurements of the $NV^-$ defect's concentration were performed by comparing the ratio of the P1 center's signal integral to the $NV^-$ center's signal integral. The latter was obtained by implementing the pulsed field-sweep Hahn echo experiment at room temperature in the absence of laser illumination.

The optical polarization saturation experiment was performed by applying optical pulses (for a duration of 2.5 ms) of progressively increasing intensity (starting at 0 mW/mm$^2$) 3 µs before performing a Hann echo experiment and fitting the echo results using EQ. (2). This sequence was typically repeated 10 times in order to average at a repetition frequency of 200 Hz. The fitted amplitude, A (EQ. (2)), is directly proportional to the ESR effective population difference, $\Delta n$. This quantity is the population difference between the observed ESR transitions. The measurement performed at 0 mW/mm$^2$ corresponds to the thermal equilibrium state at which the energy levels' population conforms to the Boltzmann distribution and is denoted by $\Delta n_0$.

Measurement of the spin-lattice relaxation time, $T_1$, was performed using the ratio between the Hann echo amplitude, $M_z(Y)$, observed for a varying set of repetition times, Y, and the echo amplitude for a very long repetition time, $M_0 = M_z(Y \to \infty)$ [19]. The experimental results were fitted to EQ. (4), below, in order to extract $T_1$.

$$\frac{M_z(Y)}{M_0} = 1 - \exp\left(-\frac{Y}{T_1}\right). \quad \text{(EQ. 4)}$$

Measurement of the transverse relaxation time, $T_2$, was performed using the Hann echo sequence with varying durations of the inter-pulse separation time, $\tau$. The resulting signal amplitude was fitted to EQ. (5), below, in order to extract $T_2$.

$$\frac{M_{xy}(\tau)}{M_0} = \exp\left(-\frac{2\tau}{T_2}\right). \quad \text{(EQ. 5)}$$

$T_2^*$ was estimated from the fit results of the $NV^-$ center's pulsed field-sweep ESR spectrum of each diamond sample. The field-sweep spectrum was converted to a frequency spectrum by applying the transformation $f = D_{gs} + (g_e \mu_B/\hbar)|B_0|$, where $D_{gs}$ is the ground state zero field splitting of the $NV^-$ (about 2.87 GHz). $T_2^*$ was then calculated by applying EQ. (6), below, to the resulting lineshape (see Ref. [1], EQ. 5-8-5):

$$T_2^* = \frac{1}{2} \max_f \{T(f, f_0 q, W_f)\} \quad \text{(EQ. 6)}$$
$$= T(f_0, f_0, q, W_f)$$
$$= \frac{1}{2}\sqrt{\frac{2^{q-1}-1}{\pi}} \frac{1}{W_f} \frac{\Gamma\left(\frac{1}{q-1}\right)}{\Gamma\left(\frac{1}{q-1}-\frac{1}{2}\right)},$$

where $\Gamma(\cdot)$ is the gamma function, $W_f = (g_e \mu_B/\hbar)W$ is half-width at half-height in units of Hz, W is the fitted field sweep spectral half-width at half-height in units of Tesla, and q is the fitted lineshape parameter.

Time-of-Flight Secondary Ion Mass Spectrometry

Measurements of the nitrogen concentration inside the diamond lattice were carried out by means of Time-of-Flight Secondary Ion Mass Spectrometry (ToF-SIMS) [20], model TOF.SIMS 5 by iONTOF GmbH. A cesium ion (Cs$^+$) sputtering beam with an energy of 2 keV was used in order to produce a $250 \times 250$ µm$^2$ creator on the diamond surface. Following this, a bismuth ion (Bi$_1^+$) primary ion source beam with an energy of 25 keV was applied to sample an area of $50 \times 50$ µm$^2$. A negative polarity extraction field was used in order to extract the secondary cyanide anions $CN^-$. The detected $CN^-$ amount was used to estimate the N concentration in the diamond bulk by performing depth profiling until a plateau in the $CN^-$ amount was reached.

Spectrophotometry Measurements

In order to measure the bulk illumination efficiency, optical transmittance measurements were performed on all diamond samples. The spectrophotometry measurements were performed using a Jasco V-530 UV/VIS spectrophotometer. The scan parameters were set to a scanning speed of 40 nm/min, wavelength pitch of 0.5 nm, and measurement range of 400-700 nm.

Results

Figure 4A:
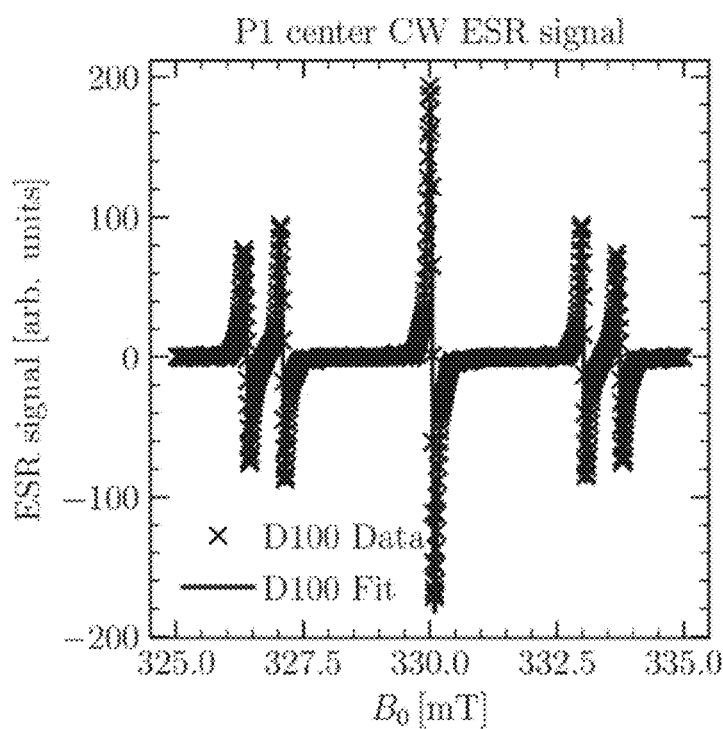
FIGS. 4A and 4B show P1 center (FIG. 4A) and H@POSS reference (FIG. 4B) ESR spectra as measured in experiments performed according to some embodiments of the present invention. Raw data are marked by crosses and a Tsallis lineshape fit is depicted by a solid line.
Figure 4B:
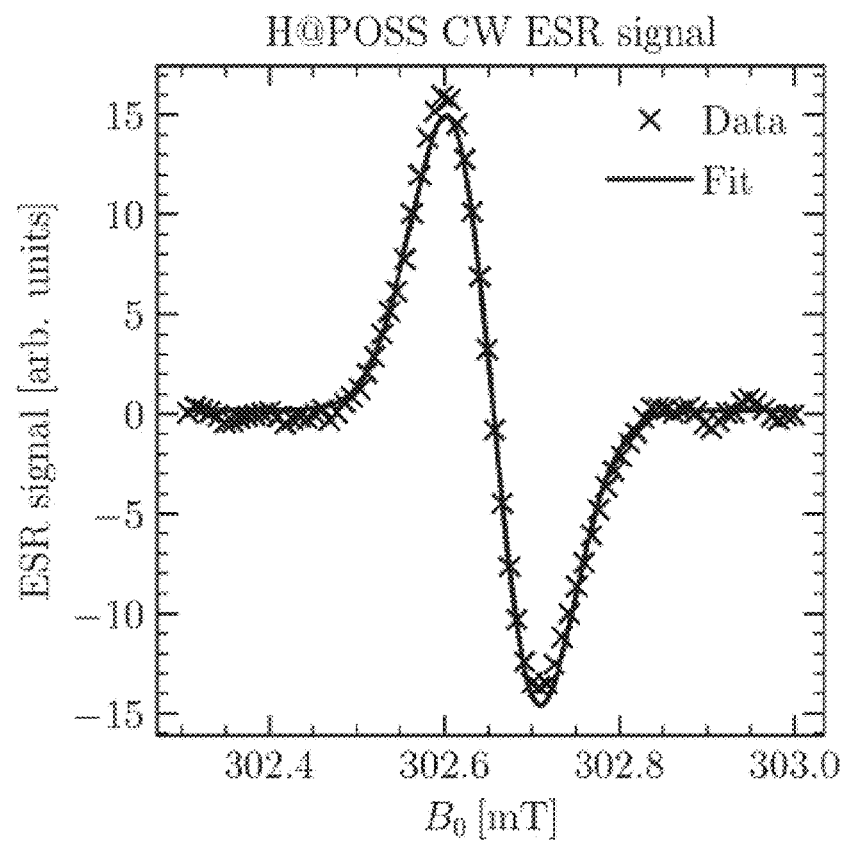

The diamonds were characterized using CW ESR spectroscopy. Typical CW ESR measurement results for the P1 centers and for one of the lines of the gamma-irradiated H@POSS are shown in FIGS. 4A-B. Raw data are marked by crosses, and the Tsallis lineshape fit is depicted by a solid line.

Figure 5A:
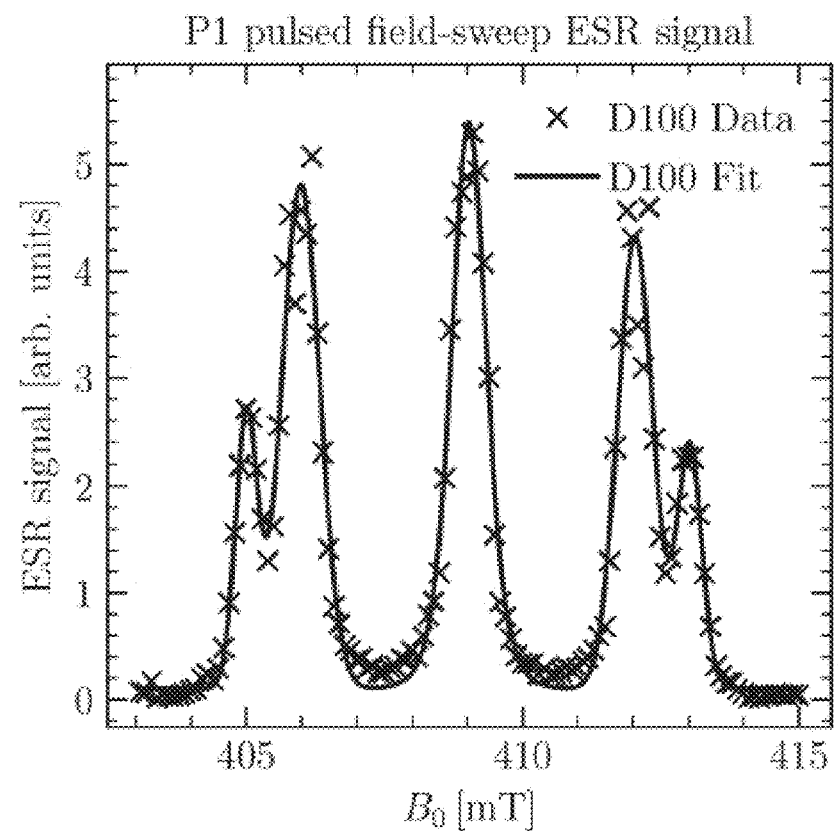
FIGS. 5A and 5B show P1 (FIG. 5A) and NV$^-$ (FIG. 5B) centers' ESR spectra as measured in experiments performed according to some embodiments of the present invention. Raw data are marked by crosses and a Tsallis lineshape fit is depicted by a solid line.
Figure 5B:
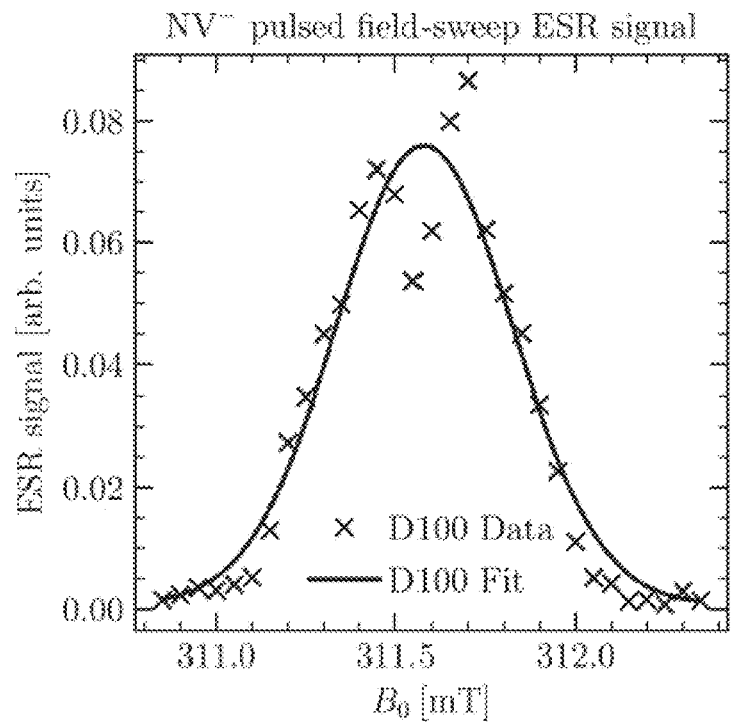

A double integral of the ESR signal was used to compare the number of spins in each sample and to deduce the P1 concentrations. Subsequently, the field-swept echo ESR spectrum of the samples was measured without light irradiation. Typical results are depicted in FIGS. 5A and 5B, where FIG. 5A shows P1 center pulsed field-sweep ESR spectrum of the D100 diamond sample, and FIG. 5B shows NV$^-$ center pulsed field-sweep ESR spectrum of the |+1>→|0> transition, measured for the D100 diamond sample without light irradiation. The integral of these ESR spectra was used to assess the NV$^-$ concentration, based on the known P1 concentration obtained from the CW ESR data.

Figure 6:
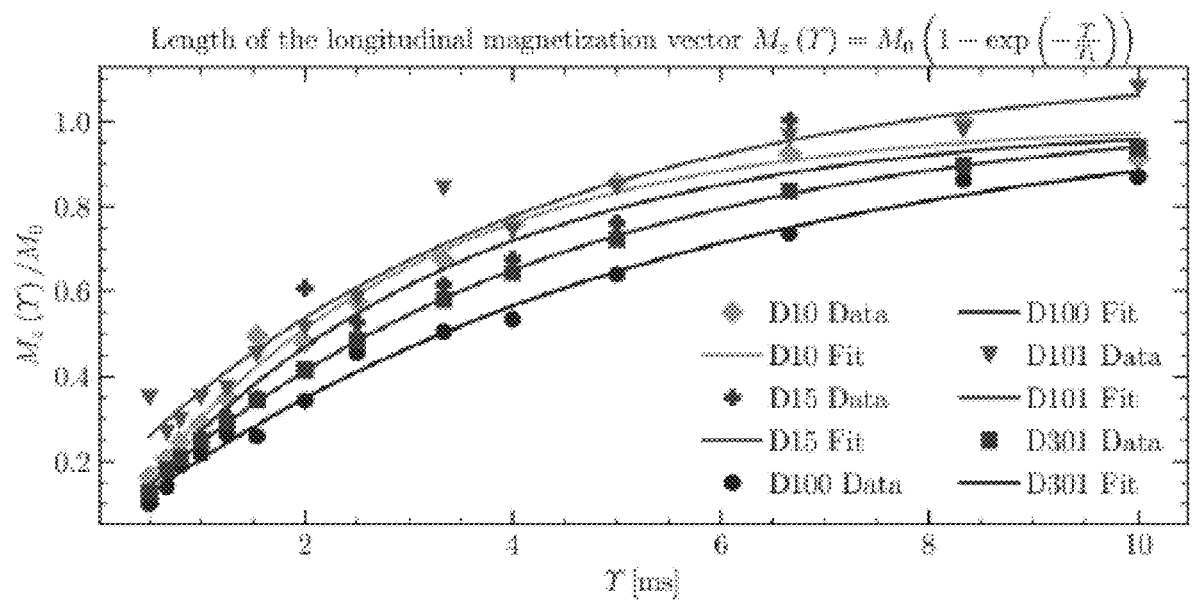
FIG. 6 shows experimental data and an analytical fit model of spin-lattice relaxation time ($T_1$) measurements obtained during experiments performed according to some embodiments of the present invention.
Figure 7:
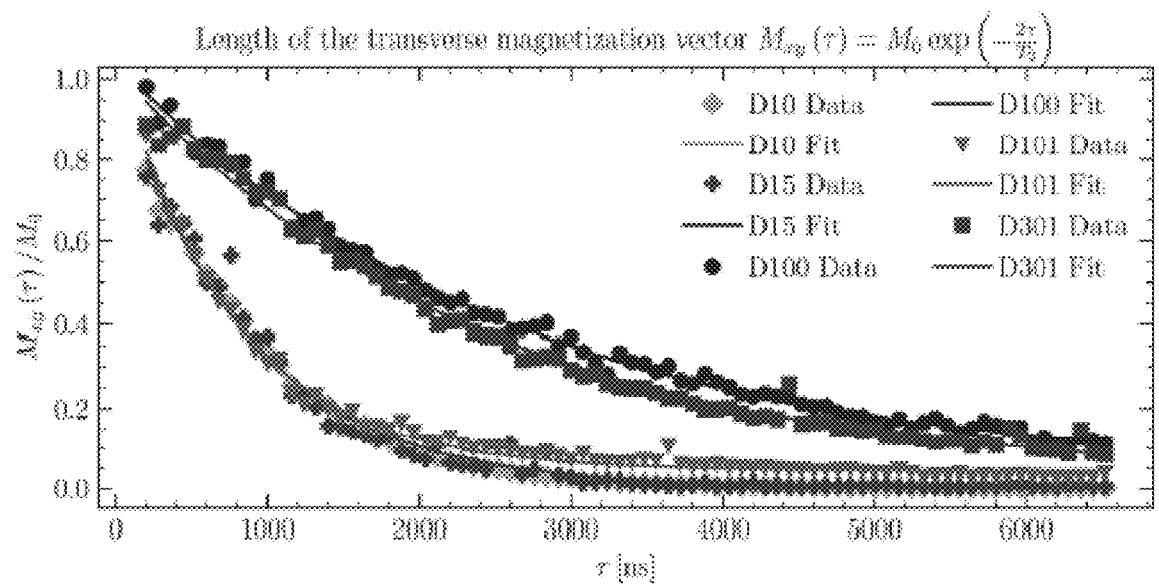
FIG. 7 shows experimental data and an analytical fit model of transverse relaxation time ($T_2$) measurements obtained during experiments performed according to some embodiments of the present invention.

Additional pulsed ESR experiments were applied to measure $T_1$, $T_2$, and $T_2^*$ using the sequences and procedure described above. The results of the $T_1$ and $T_2$ measurements for all diamond samples are presented in FIGS. 6 and 7, where FIG. 6 shows the experimental data and the analytical model of EQ. (4) of the T1 measurements, and FIG. 7 shows the experimental data and the analytical model of EQ. (5) of the $T_2$ measurements. $T_2^*$ was extracted directly from the field-swept spectral data of each sample.

The complete data, including also the SIMS-based concentration of N atoms in the diamond, is summarized in Table 2, below.

TABLE 2

| Sample | D10 | D15 | D100 | D101 | D301 |
|---|---|---|---|---|---|
| [N] (spins/cm$^3$) | 1.3 × 10$^{19}$ | 3.2 × 10$^{19}$ | 1.1 × 10$^{19}$ | 3.4 × 10$^{19}$ | 2.4 × 10$^{19}$ |
| [P1] (spins/cm$^3$) | 5.7 × 10$^{18}$ | 6.3 × 10$^{18}$ | 3.4 × 10$^{18}$ | 1.1 × 10$^{19}$ | 7.9 × 10$^{18}$ |
| [NV$^-$] (spins/cm$^3$) | 4.6 × 10$^{17}$ | 5.7 × 10$^{17}$ | 8.7 × 10$^{16}$ | 1.2 × 10$^{17}$ | 1.7 × 10$^{17}$ |
| NV$^-$/P1 Ratio | 0.081 | 0.091 | 0.025 | 0.010 | 0.021 |
| $T_1$ [ms] | 2.8 | 3.2 | 5.3 | 4.0 | 4.1 |
| $T_2$ [ns] | 1753 | 1773 | 5133 | 1576 | 4721 |
| $T_2^*$ [ns] | 29 | 28 | 29 | 33 | 33 |
| Max. Polarization Enhancement (R) | 448 | 321 | 801 | 608 | 777 |
| Effective Δn (spins/cm$^3$) | 4.8 × 10$^{16}$ | 4.2 × 10$^{16}$ | 1.6 × 10$^{16}$ | 1.7 × 10$^{16}$ | 3.0 × 10$^{16}$ |
| $Q_{th} \cdot \eta$ at 11.5[GHz] | 177.2 | 203.3 | 521.5 | 442.9 | 242.8 |

Figure 8A:
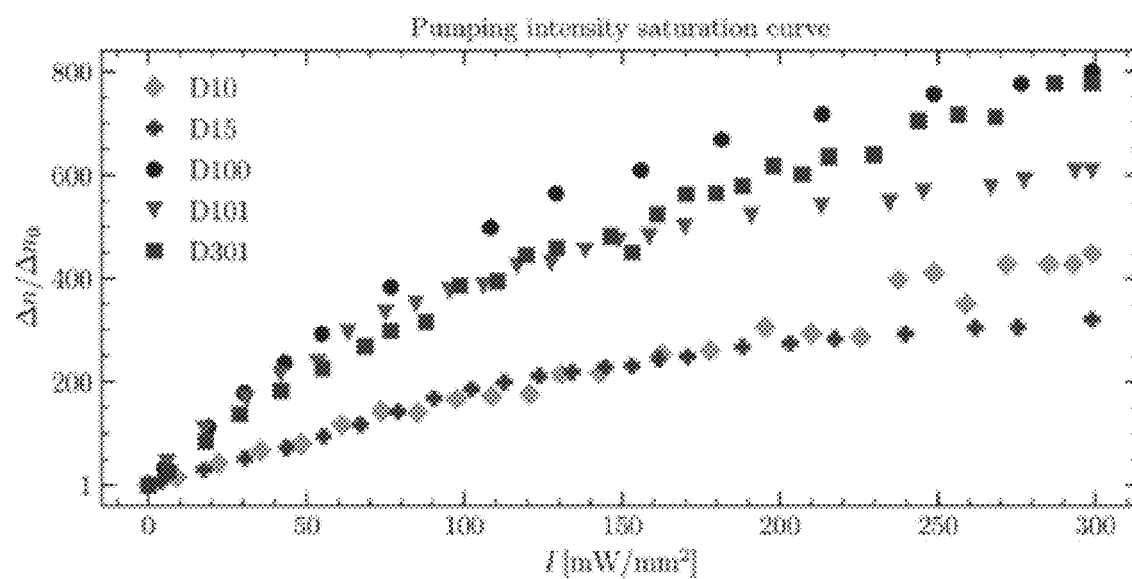
FIGS. 8A and 8B show experimental (FIG. 8A) and theoretical (FIG. 8B) optical pumping saturation curves obtained during experiments performed according to some embodiments of the present invention.
Figure 8B:
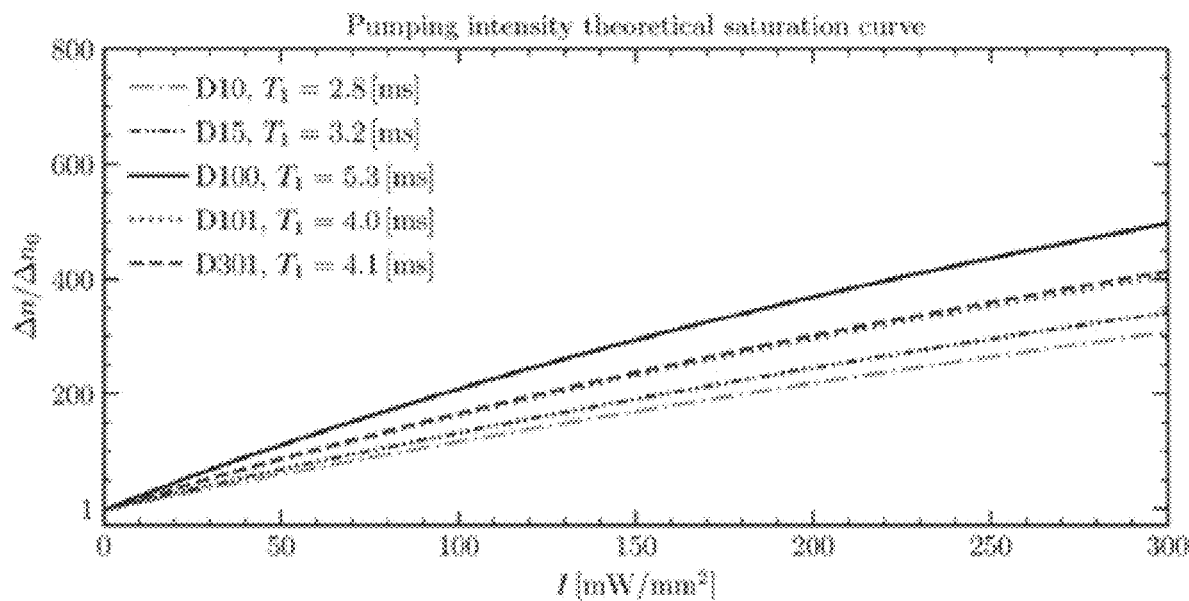
Figure 10:
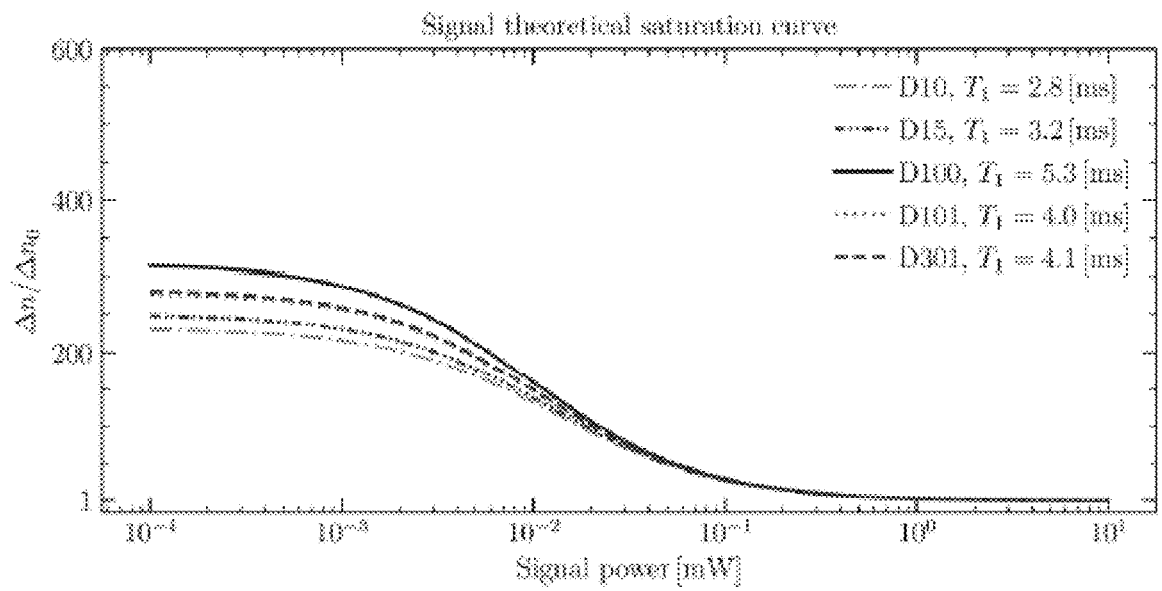
FIG. 10 shows RF signal intensity theoretical saturation curves calculated according to some embodiments of the present invention using a kinetic model for a resonator having a conversion factor of $C_p$=4 G/√W.
Figure 11:
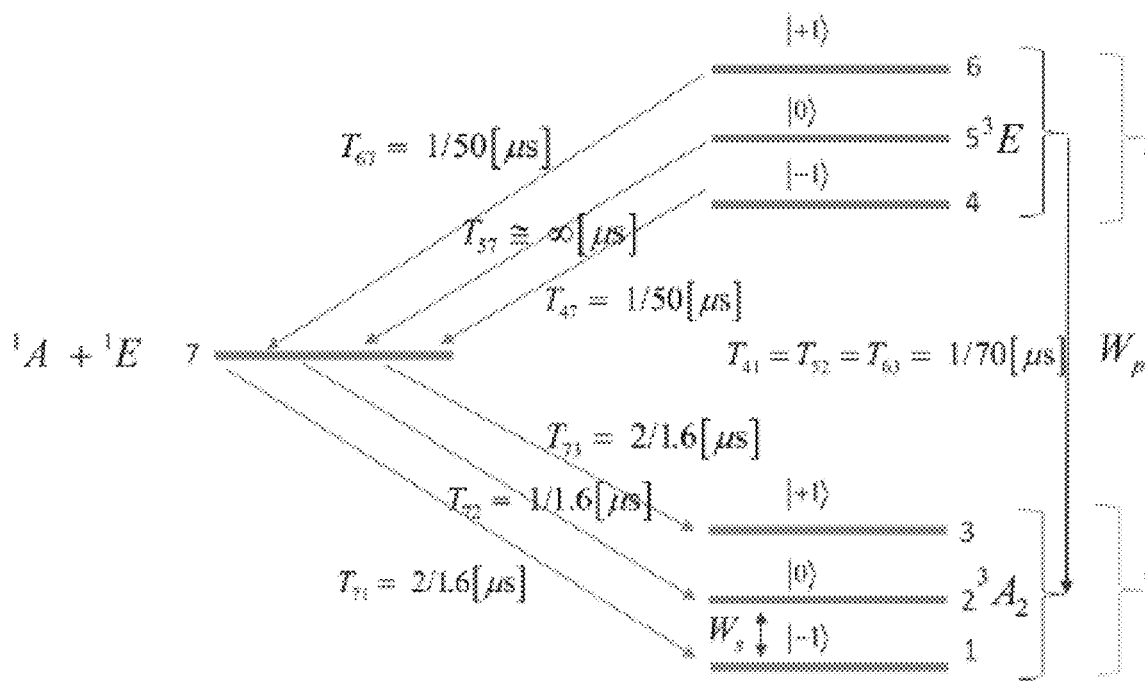
FIG. 11 shows energy levels and decay rates used for a kinetic model of some embodiments of the present invention.

Pulsed ESR was also used to assess the available spin polarization of the |0> level as a function of optical illumination power. The spin polarization ratio is shown in FIG. 8A for all samples that were measured using the procedure described above. FIG. 8B shows the simulated plots for the saturation curves, based on a kinetic model described in the appendix of Sherman et al., J. Appl. Phys. 129, 144503 (2021), the contents of which are hereby incorporated by reference, with no fitting parameters. The RF signal intensity theoretical saturation curves of this kinetic model, for a resonator having a conversion factor $C_p$=4 G/√W are shown in FIG. 10.

The spin polarization ratio $\Delta n/\Delta n_0$ in FIG. 8A was calculated using the following equation $$\Delta n = R \times \Delta n_0, \quad (7)$$

where Δn is the effective population difference between the resonant energy levels under optical illumination, R is the ratio between the ESR signal in the presence of optical illumination and the ESR signal in the absence of optical illumination, and $\Delta n_0 = [NV^-] \times (p_{|0>} - p_{|_{-1}>})$ is the Boltzmann population difference under thermal equilibrium conditions in the absence of optical illumination, which can be calculated by means of using the spin Hamiltonian provided in Ref. [21]:

$$E_{m_s} = hD(m_s)^2 + g\mu_B|B_0|m_s, \quad (EQ. 8)$$

$$Z = \sum_{m_s} \exp\left(\frac{E_{m_s}}{k_B T}\right), \quad (EQ. 9)$$

$$p|m_s\rangle = \exp\left(-\frac{E_{m_s}}{k_B T}\right)/Z. \quad (EQ. 10)$$

In the present Example, the following parameters we used in EQ. (10): temperature of 300[K] and magnetic field |B$_0$|=512.8 mT (corresponding to an allowed transition at 11.5 [GHz]).

Figure 9:
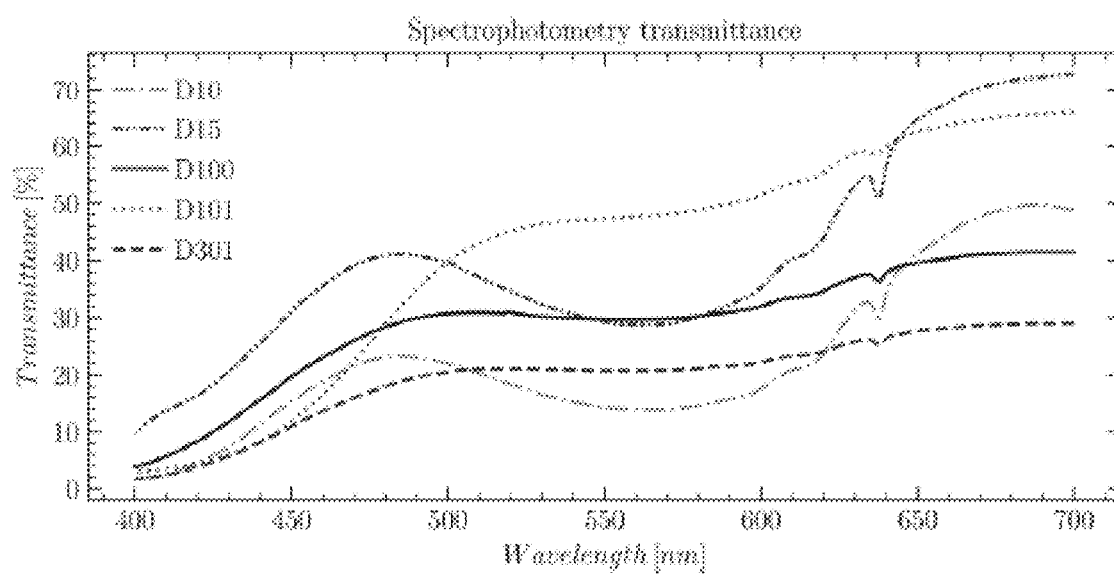
FIG. 9 shows optical transmittance of the diamond samples as a function of optical wavelength obtained during experiments performed according to some embodiments of the present invention.

The optical transmittance of the diamond sample is shown in FIG. 9.

In order to estimate the optimal properties of diamonds to be used as a gain medium in future maser applications, the quantity $Q_{th} \cdot \eta$ was calculated using the experimental results in Table 2 and the Q threshold formula of EQ. (1). This quantity is independent of the geometrical configuration and type of the resonator (cavity) used in the maser system, which manifests itself in the value of the filling factor η.

This Example explored various diamond materials for their maser-related properties. The materials differ in their nitrogen concentration, [N], (about 60-190 ppm, based on the ToF-SIMS data), and in the NV$^-$ concentration, [NV$^-$], (about 0.49-3.23 ppm, based on the pulsed EPR data), obtained using a variety of e-irradiation and annealing procedures. The experimental results demonstrate a large variation in sample relaxation times and optical-pumped spin polarization.

This Example demonstrates an NV$^-$ center with polarization an approximately 800-fold enhancement compared with the Boltzmann polarization for diamond sample D100 at an illumination intensity of about 300 mW/mm$^2$. The minimal attained enhancement was a 317-fold enhancement obtained for sample D15. All diamond samples exhibited a transmittance of the optical pumping bandwidth of about 4 nm (centered at about 520 nm), as depicted in FIG. 9, indicating that the entire diamond bulk sample was well illuminated by the light source.

The inventors found that a $T_2^*$ range of from about 28 nm to about 33 nm is preferred for achieving a desired value for Δf. Previous studies that examined $T_2^*$ as a function of [N] showed that it follows the general trend:

$$\frac{1}{T_2^*} = A \cdot [N], \quad (EQ. 11)$$

where A is about 101 ms$^{-1}$/ppm [14]. Based on this empirical expression, [N] is expected to be about 300 ppm. Since the constant A can have wide variability in different types of diamond material [14] the results presented herein are in agreement with EQ. 11.

The Q-factor of the host cavity optionally and preferably matches the bandwidth of operation, namely Q=f$_0$/Δf. For X-band operation (about 10 GHz), this implies Q of about 1000. For higher frequencies, Q can be correspondingly larger. The higher the Q of the cavity, the easier it would be to achieve the maser threshold, because $Q_{th}$ is smaller than Q. Thus, while Q is not a property of the material per se, it does reflect on the preferred material characteristics that can allow the device to comply with the maser threshold equation.

Substituting a value of 1000 for Q for a system operating at X-band, one obtains:

$$Q\eta \sim 1000\eta > \frac{\hbar}{\mu_0 g_e^2 \mu_B^2 (T_2^* \Delta n)} \equiv Q_{th}\eta, \quad (EQ.\ 12)$$

Table 2 above lists the $Q_{th}\eta$ values for the samples examined in this Example. They range from about 177 to 521. This means that by designing the resonator such that the filling factor value is above about 0.5, the maser threshold can be achieved with a modest resonator Q of about 1000.

The gain achievable with the diamond samples explored in this Example can be found using the equation (see Ref. [1], equation 6-4-6):

$$G[dB] = \frac{27}{Q_{th} + Q_L} \times \frac{f_0}{\Delta f}, \quad (EQ.\ 13)$$

where $Q_L = \pi T_2^* f_0$. Plugging in the values $T_2^* = 28$ ns, $Q_{th} = 355$ (for $\eta = 0.5$), and assuming $\Delta f \approx 10$ MHz, one obtain a gain G of about 22 dB.

The saturation power of a maser device according to some embodiments of the present invention is expected to be affected by the incident optical power's density and by the spin-lattice relaxation time, $T_1$, of the spins' energy levels. The latter is similar in all the materials examined in this Example (about 3-5 ms), but the saturation power can be sensitive to such variations (see FIG. 10). The empirical results obtained in this Example using the dielectric resonator show that an optical power density of about 100-300 mW/mm$^2$ is sufficient to maintain population inversion even with an average excitation microwave power of about 7 µW. The dielectric resonator used in this Example has a MW power conversion factor of about 4 (measured using the π/2 pulse length), so that an average power of about 7 µW corresponds to an average $B_1$ of about 10 mG. These results are in agreement with the aforementioned kinetic model (FIGS. 8B and 10). Thus, for given values of $\eta$ and $C_p$, and for a desired MW saturation power the preferred optical power can be selected.

The possible lower limit of the noise temperature of the maser device of the present embodiments is also estimated in this Example. This temperature is equal to the spin temperature, $T_s$, given by $\Delta n = N \tan h(hf/2k_B T_s)$ (see Ref. [1], EQ. 8-5-1). In this Example, the smallest $T_s$ obtained was about 0.3 K (corresponding to the 800-fold increase in signal vs. thermal state).

Example 2

Figure 12:
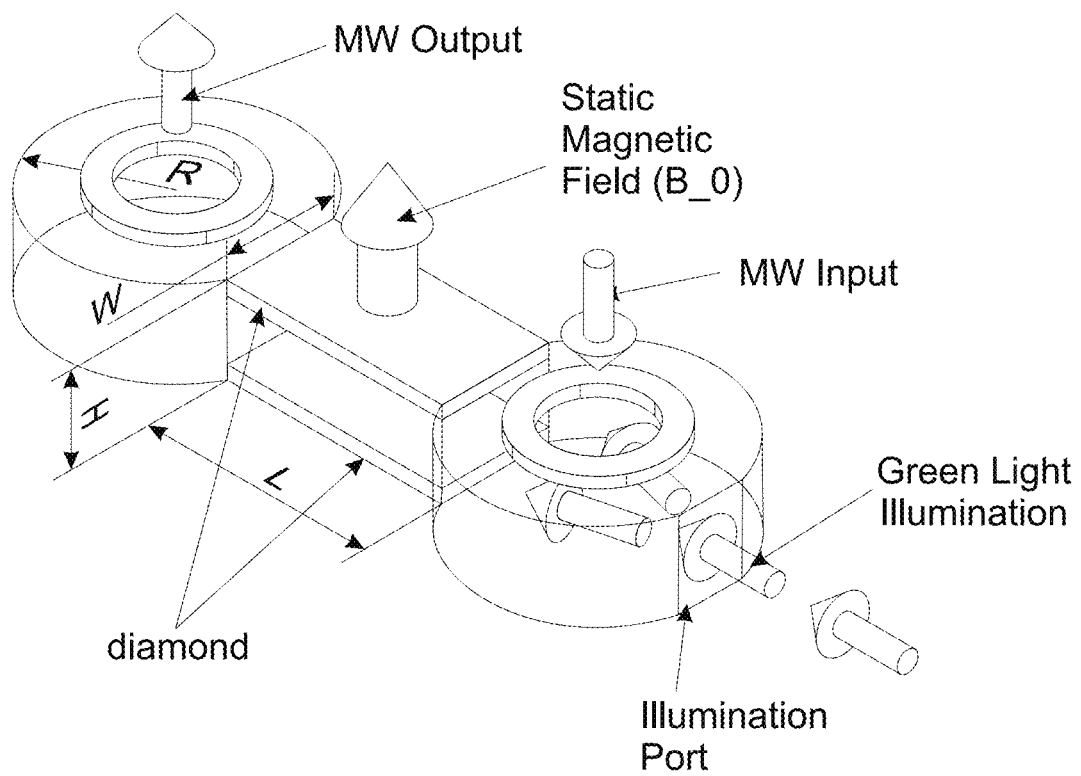
FIG. 12 is a schematic illustration exemplifying prototype setup of a specially tailored cavity used to implement a MASER device. The rectangular prisms are the locations of the diamond crystals in the cavity, the illumination port window is the aperture used to illuminate the diamond crystals in order to support the required population difference for MASER amplification (green arrows). The two circles indicate the apertures used for two-port microwave (MW) amplification configuration. Arrows indicate the MW energy coming in and out of the cavity structure. The direction of the static magnetic field, $B_0$, is also shown by an arrow. The dimensions W, H, L, and R depend on the required resonance frequency of the cavity. For example, at 35 GHz, W=5 mm, H=4 mm, L=10 mm, and R=5.417 mm.
Figure 13:
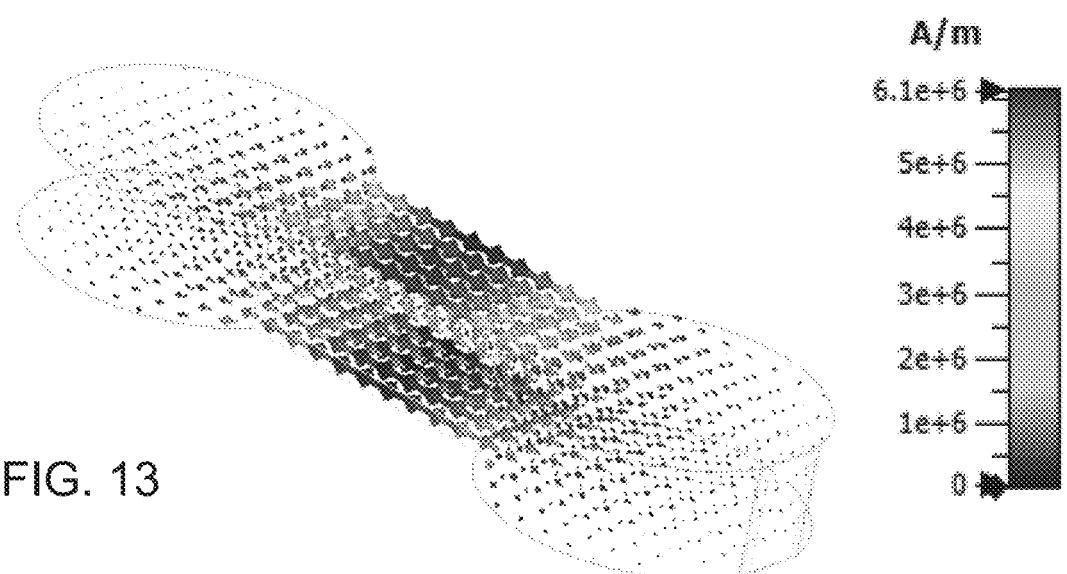
FIG. 13 shows a distribution of an MW magnetic field $B_1$ in the MASER's cavity. The distribution was designed in order to localize and concentrate the microwave magnetic field on the diamond crystals bulk volume, maximizing their filling factor in the microwave cavity.

The separation between the energy levels is determined by the strength of a static magnetic field, $B_0$ applied to the device, and the population inversion can be established by green light illumination. Typical setup of an exemplified prototype device and its components is shown in FIGS. 12 and 13.

The diamond crystals (rectangular bricks in FIG. 12) have [1 1 1] orientation, meaning that for common diamond material about one fourth of the NVs are alighted with their axis alone the static $B_0$ axis. In principle, this ratio can go up to 1 if the NVs are generated in orientation preferred manner. A description of preferred diamond material options is provided further below. The crystals are optionally and preferably placed in a rectangular void which is extended by two cylindrical cavities forming a Cassini oval-like shape which in turn supports a cavity mode designed to localize and concentrate the $\vec{B}_1$ field distribution (depicted in FIG. 13) on the diamond crystals, which in turn serves to maximize the cavity filling factor to at be least $\eta_{ours} \sim 0.65$ ($\eta$ is defined as $$\eta = \frac{\int_d |B_1^t|^2 dV}{\int_r |B_1|^2 dV},$$

where the nominator integrates the modulo square of the MW field, $B_1$, component tangential to the static field, $B_0$, direction over the diamond volume and the denominator integrates the modulo of $\vec{B}_1$ square over the entire cavity volume, see also below).

The cavity design natively incorporates a low loss illumination port (see FIG. 12), intended for optical NV$^-$ center pumping to establish the population inversion difference, Δn, between the upper and lower energy levels of the NV$^-$ transition used for maser amplification.

The design provided in this Example supports both a single port configuration (where the MW output port in FIG. 12 is shorted out), particularly useful for signal generation applications, and two-port configuration which possesses enhanced noise performance for signal amplification applications. A two-port configuration is depicted in FIG. 12 and is realized by circular apertures in the cylindrical section of the cavities, which are used to couple the cavity mode energy directly in or out to the fundamental TE$_{11}$ mode of a circular waveguide attached to it (not shown in FIG. 12).

The specially tailored cavity and the diamond material employed according to some embodiments of the present invention allow relatively broadband, high gain, and high saturation power amplification process of incoming electromagnetic radiation. This amplification process occurs at room temperature, but yet contributes very small amounts of noise to the signal—preferably at the quantum limit. The same 2-port device can be used for (i) low noise signal amplification of classical microwave radiation in the frequency range of ~1-100 GHz, (ii) amplification of quantum electromagnetic radiation (e.g., single photons) and subsequent detection of quantum electromagnetic radiation and identifying its quantum state (e.g., polarization), and (iii) can be used for quantum cloning of the quantum state of incoming photons to generate many copies of the same quantum state (with any given fidelity that is less than 100%).

The one-port device can be used as signal source with high coherence and low phase noise, see also [IEEE Transactions on Instrumentation and Measurement, Volume: 40, Issue: 2, April 1991) Page(s): 174-177].

There are several significant differences between the system described herein and the one described in Ref. [12], and also in U.S. Published Application No. 2017/0077665.

In terms of the cavity/resonator configuration, the cavity of the present embodiments is characterized by a quality factor Q of from about 100 to about 1000. This is significantly lower than the quality factor reported by Ref. [12] (30,000-55,000). Unlike Ref. [12], which requires a combination of a conductive cavity surrounding a dielectric ring, the device of the present embodiments optionally uses a dielectric resonator that is not encompassed within a conductive cavity. On the other hand, the filling factor of the device of the present embodiments is η≈0.65, which is substantially higher than the filling factor reported in Ref. [12] (0.01-0.02). These two factors compensate for each other, since the maser threshold equation reads:

$$Q_{th} = \frac{\hbar}{\mu_0 g_e^2 \mu_B^2 (T_2^* \Delta n)\eta} \equiv -Q_m,$$

where $Q_{th}$ is the minimum value required to sustain maser amplification action. The quantities $\mu_0$, $g_e$ and $\mu_B$ are physical constants (free space permeability, electron g-factor and Bohr magneton, respectively), $T_2^*$ represents the inverse spectral linewidth of the NV⁻, $\Delta f$, defined as $\Delta f = 1/\pi \cdot T_2^*$ and $\Delta n$ is the population inversion difference between the upper and lower energy levels of the NV⁻ transition used for maser amplification. One advantage of using such configuration is that the instantaneous bandwidth, $\Delta f$, of the device can be made much larger since $\Delta f_{cavity} \sim f_0/Q$, where $f_0$ is the central operation frequency. Accordingly, the instantaneous bandwidth of the resonator reported in Ref. [12] is 9.2 GHz/50,000=184 kHz, which is significantly lower than the instantaneous bandwidth of the cavity achievable by the device of the present embodiments (from about 35 GHz/1000=35 MHz to about 35 GHz/100=350 MHz).

Another difference between the device presented herein and the configuration reported in Ref. [12], relates to the diamond single crystal properties, and particularly to the concentration of substitutional Nitrogen impurities and accordingly, the concentration of NV centers. Ref. [12] is aiming for very sharp transitions with relatively long $T_2^*$ (0.52 μs) and long spin-lattice relaxation time, $T_1$, (4.6 ms), where the substitutional nitrogen and NV⁻ concentration are relatively small (5 and 0.36 ppm, respectively), which can also be written as $8.8 \times 10^{17}$ N and $6.3 \times 10^{16}$ NVs per cm³). In distinction, the device optionally and preferably employs much larger N and NV⁻ concentrations of about 100-200 and about 2-100 ppm, respectively, depending on the conversion efficiency. Accordingly, in the device of present embodiments, $T_2^*$ is about 35 ns and $T_1$ is about 6 ms, at room temperature. While it is preferred to use much more excitation optical power, the present embodiments supports a larger bandwidth of operation, since the maser transition width is $\Delta f_{maser} \sim 1/\pi T_2^*$. In Ref. [12], the maser transition width is about 0.6 MHz, in distinction from the device of the present embodiments which preferably employs a maser transition width of about 9.1 MHz.

Another difference between the device presented herein and the configuration reported in Ref. [12] relates to the crystal orientation. The present embodiments optionally and preferably employ diamond with crystal orientation of [1 1 1]. Such orientation allows better placement of the diamond in the rectangular section of our cavity. In distinction, Ref. [12] employs a [1 0 0] orientation inside a cylindrical resonator, which requires carful crystal rotations inside it and results in smaller filling factor.

Another difference between the device presented herein and the configuration reported in Ref. [12] relates to the saturation power of the device. Saturation is governed by the following equation:

$$\Delta n = \Delta n_0 \frac{1}{1 + \gamma^2 B_1^2 T_1 T_2},$$

where $\Delta n_0$ is the population inversion difference between the upper and lower energy levels at the limit of zero power in the maser cavity. The factor $\gamma$ is the electron gyromagnetic ratio, and $B_1$ is the microwave magnetic field in the cavity, which can be evaluated by the expression $B_1 = C_p \times \sqrt{(W)}$, where W is the power going in/out of the cavity, and $$C_p \approx \sqrt{Q\mu_0/V_c\omega_0},$$

with $V_c$ being the mode volume of the cavity. Saturation occurs when too much power is coming in/out of the maser cavity. One typically defines the saturation factor, $s = \gamma^2 B_1^2 T_1 T_2$, so that when $s \geq 1$ the signal starts to saturate. Factors such as cavity $V_c$, Q, and the diamond's $T_1$ $T_2$, thus affect the saturation of the device. In Ref. [12], $V_c = 0.15 \times 10^{-6}$ m³, Q~30,000, $T_1$~4.8 ms and $T_2$~20.5 μs.

Ref. [12] discloses a microwave source with maximum power output of 1 pW. The inventors found that such power level is too low to be of practical use as an amplifier. Under such conditions, $$C_p \approx \sqrt{30,000 \times 4\pi \times 10^{-7}/0.15 \times 10^{-6} \times 2\pi \times 9.4 \times 10^9} = 0.0021\ T/W^{1/2},$$

resulting in $B_1$ of about $2.1 \times 10^{-9}$ T for 1 pW output power, resulting in a saturation factor of s≈0.0134. It is assumed that $T_1$ is larger so the actual s may also be larger, approaching 1. In distinction, the configuration of the present embodiments provides $V_c \approx 0.044 \times 10^{-6}$ m³, Q≈4,000, $T_1 \approx 13$ ms and $T_2 \approx 1.5$ μs. Under such conditions, $$C_p \approx \sqrt{1,000 \times 4\pi \times 10^{-7}/0.044 \times 10^{-6} \times 2\pi \times 35 \times 10^9} = 0.00036\ T/W^{1/2},$$

resulting in $B_1$ of about $3.6 \times 10^{-10}$ T for 1 pW output power, which gives a saturation factor of s≈7.8×10⁻⁵. This means that the device of the present embodiments can sustain power level of more than 10 nW, without being saturated. Such power level is sufficient to be of practical use as an amplifier.

Another difference between the device presented herein and the configuration reported in Ref. [12] relates to the gain of the amplifier. The known expression for the so called gain-bandwidth product of a maser amplifier is $$G^{1/2}B = \frac{2f_0}{|Q_m|}.$$

Where $Q_m$ is the maser amplifier negative quality factor defined above. Since $|Q_m|$ is smaller than Q of the cavity, and since the quality factor of the device of the present embodiments is lower than that of Ref. [12], the device of the present embodiments has a much larger gain bandwidth, thereby allowing higher bandwidth operation.

The Inventor found that the configuration in Ref. [12] has a very poor heat dissipation since the diamond is surrounded by the air inside a cavity and a dielectric resonator. In the configuration of the present embodiments, the rectangular diamond crystals are optionally and preferably held tightly and closely to a large metallic cavity, thus allowing good heat dissipation that is required due to the large optical pump power (reaching as much as 10 W or more).

Example 3

The diamonds employed in a prototype device according to some embodiments of the present invention were fabricated from raw material (Sumitomo, part #CD1006/111). The raw material underwent irradiation by electron beam with energy of 2-5 MeV, in a dose of about $1$-$2 \times 10^{19}$ electrons/cm$^2$. This process took about 90-180 hours in common industrial electron accelerators. The diamonds then underwent 4 hours of heat treatment at 800° C. in vacuum and are then cleaned with combination of nitric and Sulfuric acid. The N to NV$^-$ conversion efficiency of such process is about 2-4%. Also contemplated is the process described in Kucsko et al., Phys. Rev. Lett. 121, 023601. In this process, the irritation is carried out at a temperature of 700-800° C. providing conversion efficiency of 45%.

Example 4

Sample: [1 1 1] diamond 3×3×0.6 mm in size from Sumitomo, part #CD 1006/111, contained about 200 ppm nitrogen. NV signal thermal population was calculated at 11.54 GHz using a plot similar to the plot shown in FIG. 1A, simulated by EasySpin Software. The equations used for describing the thermal state were:

$$N_1/N_0 = \exp(-\Delta E_{10}/k_B T) = 0.998161981084498;$$

$$N_0/N_{-1} = \exp(-\Delta E_{0-1}/k_B T) = 0.999050306317228; \text{ and}$$

$$N_1 + N_0 + N_{-1} = 1$$

Solving the equations, one obtains:
$N_{-1} = 0.333748924249565;$
$N_0 = 0.333431965004573;$
$N_1 = 0.332819110745862;$ The difference $\Delta n$ between $N_1$ and $N_0$ was $\Delta n = 6.128542587109931\text{e-}04 \times N$ where N is the total number of NV$^-$ measured.

In the current experiment, the Inventors observed a thermal signal of the NV$^-$ at about 310 mT, and obtained an ESR signal of about 13 mV. Under laser illumination (about 50 mW per 1 mm^2) and about 1 microW average MW excitation pulses, the Inventors obtained a signal of about 9000 mV. This means that $\Delta n$ is about 9000/13, approximately 692 times larger than the thermal one: $\Delta n \approx 0.42 \times N$.

In order to find N, the Inventors used field swept echo ESR signal data, and obtained plots similar to the plots shown in FIGS. 5A and 5B. The integral of P1 was found to be about 3000 in the arbitrary signal scale used. The integral of NV$^-$ was found to be about 5.5. However, since the NV signal is roughly about ⅛ of the total signal of all NVs in all orientations, it was multiplied by 8 (4 orientations, 2 transitions for each) to get the total NV$^-$ number. So, the total integral was expected to be about 44 and the ratio between the P1 signal and the NV signal was found to be about 3000/44≈68. This means that roughly about 3 ppm of NVs were expected, namely about $1.77 \times 10^{23} \times 3 \times 10^{-6} = 5.3 \times 10^{17}$ spins per cm$^3$. Thus, in the present Example, $\Delta n \approx 0.42 \times 5.3 \times 10^{17}/4 = 5.56 \times 10^{16}$ spins/cm$^3$.

These were calculated at a field of 310 mT. In practice, MASER for 11.54 GHz can operate on the other transition, at about 515 mT, but $\Delta n$ is expected to be within the same order of magnitude as presented in this example.

Another parameter of relevance is $T_2^*$, which was measured to be about 35 ns.

Plugging the parameters into the maser threshold equation, the following value for $Q_{th}$ was obtained, for a filling factor $\eta = 0.6$:

$$Q_{th} = \frac{\hbar}{\mu_0 g_e^2 \mu_B^2 (T_2^* \Delta n_{ij}) \eta}$$

The obtained numerical value was $Q_{th} \approx 200$, which is reasonable to attain. Specifically, any cavity with Q larger than 200, ensures initiation of maser action in this example.

The device of the present embodiments can be used for low noise signal amplification of classical microwave radiation in the frequency range of about 1-100 GHz. This capability is advantageous for a variety of communication and radar applications. For example, in all applications that involve receiving MW signals from above ground (e.g. high altitude plans, satellites, spacecraft), the surrounding noise environment has very low levels, and it would be advantageous to use low noise amplifiers based on the exemplified device. The amplifiers can be paced in the first critical stage of amplification.

Figure 14:
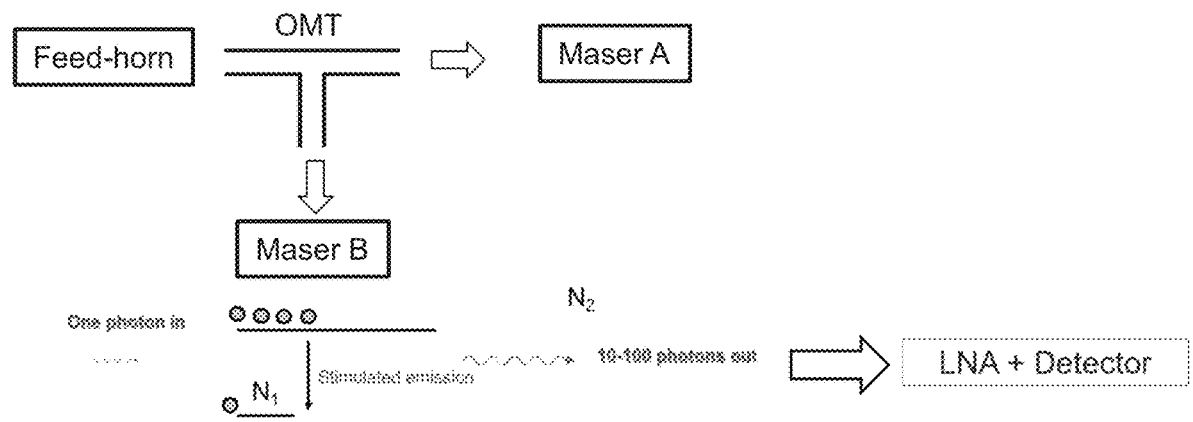
FIG. 14 is a schematic illustration of an exemplified setup for detecting single MW photons and determine their quantum state, according to some embodiments of the present invention.

The device of the present embodiments can be used for amplification of quantum electromagnetic radiation (e.g., single photons) and subsequent detection of this quantum electromagnetic radiation and identifying its quantum state (e.g. polarization). This capability is advantageous for quantum communication channels (for example, quantum key distribution protocols) that operate with single photons and need to detect them individually with high fidelity and evaluate their quantum state. In these embodiments the device can be optionally and preferably cooled to moderate cryogenic temperatures that are available by electrical cooling. Depending on the exact quantum property that desired detection, more than one device can be employed. For example, FIG. 14 illustrates an embodiment suitable for detecting the polarization of an incoming photon. An orthomode transducer (OMT) receives a quantum signal from a feed horn and guides it according to its polarization (e.g., vertical or horizontal) to one of two output ports. Two masers as described herein are constituted to receive the quantum signal from the respective port, to amplify it and to transmit the amplified signal to a separate low noise amplifier (LNA) and a separate detector, thus detecting the polarization based on the port of the OMT from which the quantum signal exits.

The device of the present embodiments can be used for quantum cloning of the quantum state of incoming photons to generate many copies of the same quantum state (with a given fidelity). This capability is useful for the operation of MW-based quantum communication and quantum radar systems.

The device of the present embodiments can be used as a one-port device suitable as coherent microwave sources with low phase noise and high sort term (about 1-60 seconds) stability. Such sources can be used to a variety of communication and radar applications.

Embodiments of the present invention use the maser amplifier as a quantum detector of single photons and quantum cloner. This is different than traditional uses of masers, which are aimed at looking at amplification of classical MW radiation. Specifically, the diamond-based maser of the present embodiments optionally and preferably operates at completely different regimes in terms of the cavity and the active material (diamond) properties. For example, instead of pushing a cavity+resonator to the highest possible Q factor and, accordingly, seeking NVs in the diamond material with relatively long coherence time ($T_2$*), some embodiments of the present invention operate only with cavity, without a high Q resonator, with modest cavity Q factors and NVs in the diamond that have relatively short $T_2$*, but compensate for that with a large number of NVs and a high filling factor.

The present embodiments provide a cavity design that allows efficient light irradiation and a high filling factor with $B_1$ that is perpendicular to $B_0$ with diamond single crystals oriented in [1 1 1] orientation parallel to $B_0$.

This Example demonstrates that the device of the present embodiments allows having larger bandwidth of operation, larger gain, higher power saturation, better heat dissipation, and simpler placement of the diamond position in the cavity, without cumbersome alignment procedures and without the use of high Q-dielectric resonator.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] A. E. Siegman, Microwave Solid-State Masers (McGraw-Hill, 1964).

[2] J. Yuen, G. Resch, and C. Stelzried, Telecommunications technology development for the deep space network, Acta Astronautica 25, 51 (1991).

[3] R. J. Collier, M. A. Collins, and D. G. Moss, An x-band electron spin resonance spectrometer with a ruby maser preamplifier, Journal of Physics E: Scientific Instruments 1, 607 (1968).

[4] C. Ditchfield, Noise limits of a maser system, Solid-State Electronics 4, 171 (1962).

[5] L. L. Lewis, An introduction to frequency standards, Proceedings of the IEEE 79, 927 (1991).

[6] M. L. Jones, G. J. Wilkes, and B. T. H. Varcoe, Single microwave photon detection in the micromaser, Journal of Physics B: Atomic, Molecular and Optical Physics 42, 145501 (2009).

[7] H. Hsu and F. K. Tittel, Optical pumping of microwave masers, Proceedings of the IEEE 51, 185 (1963).

[8] E. Sabisky and C. Anderson, Solid-state optically pumped microwave masers, IEEE Journal of Quantum Electronics 3, 287 (1967).

[9] A. Blank and H. Levanon, Applications of photoinduced electron spin polarization at room temperature to microwave technology, Applied Physics Letters 79, 1694 (2001), https://doi(dot)org/10.1063/1.1401790.

[10] A. Blank and H. Levanon, Toward maser action at room temperature by triplet-radical interaction and its application to microwave technology, RIKEN REVIEW 44, 128 (2002).

[11] M. Oxborrow, J. D. Breeze, and N. M. Alford, Room-temperature solid-state maser, Nature 488, 353 (2012).

[12] J. D. Breeze, E. Salvadori, J. Sathian, N. M. Alford, and C. W. M. Kay, Continuous-wave room-temperature diamond maser, Nature 555, 493 (2018).

[13] M. W. Doherty, N. B. Manson, P. Delaney, F. Jelezko, J. Wrachtrup, and L. C. Hollenberg, The nitrogen-vacancy colour centre in diamond, Physics Reports 528, 1 (2013), the nitrogen vacancy colour centre in diamond.

[14] J. F. Barry, J. M. Schloss, E. Bauch, M. J. Turner, C. A. Hart, L. M. Pham, and R. L. Walsworth, Sensitivity optimization for nv-diamond magnetometry, Rev. Mod. Phys. 92, 015004 (2020).

[15] S. Stoll, A. Ozarowski, R. D. Britt, and A. Angerhofer, Atomic hydrogen as high-precision field standard for high-field epr, Journal of Magnetic Resonance 207, 158 (2010).

[16] M. Tseitlin, S. S. Eaton, and G. R. Eaton, Uncertainty analysis for absorption and first derivative electron paramagnetic resonance spectra, Concepts in Magnetic Resonance Part A 40A, 295 (2012), https://onlinelibrary(dot)wiley(dot)com/doi/pdf/10.1002/cmr.a.21248.

[17] D. F. Howarth, J. A. Weil, and Z. Zimpel, Generalization of the lineshape useful in magnetic resonance spectroscopy, Journal of Magnetic Resonance 161, 215 (2003).

[18] L. Shtirberg, Y. Twig, E. Dikarov, R. Halevy, M. Levit, and A. Blank, High-sensitivity qband electron spin resonance imaging system with submicron resolution, Review of Scientific Instruments 82, 043708 (2011), https://doi(dot)org/10.1063/1.3581226.

[19] W. B. Mims and J. Peisach, Electron spin echo spectroscopy and the study of metalloproteins, in Biological Magnetic Resonance: Volume 3, edited by L. J. Berliner and J. Reuben (Springer US, Boston, MA, 1981) Chap. 5, pp. 258-260.

[20] A. Benninghoven, Chemical analysis of inorganic and organic surfaces and thin films by static time-of-flight secondary ion mass spectrometry (tofsims), Angewandte Chemie International Edition in English 33, 1023 (1994), https://onlinelibrary(dot)wiley(dot)com/doi/pdf/10.1002/anie.199410231.

[21] J.-P. Tetienne, L. Rondin, P. Spinicelli, M. Chipaux, T. Debuisschert, J.-F. Roch, and V. Jacques, Magnetic-field-dependent photodynamics of single NV defects in diamond: an application to qualitative all-optical magnetic imaging, New Journal of Physics 14, 103033 (2012).

[22] M. Drake, E. Scott, and J. A. Reimer, Influence of magnetic field alignment and defect concentration on nitrogen-vacancy polarization in diamond, New Journal of Physics 18, 013011 (2015).

[23] M. E. Drake, Characterizing and modeling spin polarization from optically pumped nitrogen vacancy centers in diamond at high magnetic fields.

[24] M. Loretz, H. Takahashi, T. F. Segawa, J. M. Boss, and C. L. Degen, Optical hyperpolarization of nitrogen donor spins in bulk diamond, Phys. Rev. B 95, 064413 (2017).

[25] H. Clevenson, M. E. Trusheim, C. Teale, T. Schröder, D. Braje, and D. Englund, Broadband magnetometry and temperature sensing with a light-trapping diamond waveguide, Nature Physics 11, 393 (2015).

[26] L. Jin, M. Pfender, N. Aslam, P. Neumann, S. Yang, J. Wrachtrup, and R.-B. Liu, Proposal for a room-temperature diamond maser, Nature Communications 6, 8251 (2015).

[27] G. D. Fuchs, V. V. Dobrovitski, R. Hanson, A. Batra, C. D. Weis, T. Schenkel, and D. D. Awschalom, Excited-state spectroscopy using single spin manipulation in diamond, Phys. Rev. Lett. 101, 117601 (2008).

[28] N. Reddy, N. Manson, and E. Krausz, Two-laser spectral hole burning in a colour centre in diamond, Journal of Luminescence 38, 46 (1987).

[29] C. Poole, Electron spin resonance: a comprehensive treatise on experimental techniques (Dover Publications, Mineola, N.Y., 1996).

What is claimed is:

1. A microwave device, comprising:
a cavity containing a crystal having paramagnetic defects, said crystal being responsive to light;
a magnetic field source for applying magnetic field to said cavity and crystal; and
a light source for generating a pump light beam directed to said crystal and having a frequency selected to induce inversion of spin energy levels of said crystal;
wherein dimensions and shapes of said cavity and said crystal are selected such that a filling factor associated with a secondary magnetic field generated by microwave radiation resulting from said inversion is from about 0.3 to about 0.8.

2. The device according to claim 1, configured to operate at a frequency selected within the frequency range spanning from about 1 GHz to about 100 GHz.

3. The device according to claim 1, configured to operate at a frequency selected within the X frequency range.

4. The device according to claim 1, wherein said cavity is characterized by a quality factor of from about 100 to about 5000.

5. The device according to claim 1, wherein said crystal is diamond.

6. The device according to claim 5, wherein said diamond has a have [1 1 1] orientation.

7. The device according to claim 5, wherein said paramagnetic defects comprise nitrogen impurities.

8. The device according to claim 7, wherein a concentration of nitrogen vacancy centers within said diamond is from about 0.4 ppm to about 50 ppm.

9. The device according to claim 1, wherein paramagnetic defects are at concentration selected to ensure an effective transverse relaxation time, $T2^*$, of from about 25 ns to about 50 ns, and a spin-lattice relaxation time, $T1$, of from about 2 ms to about 5 ms.

10. The device according to claim 1, wherein said paramagnetic defects are at a concentration of at least 150 ppm.

11. The device according to claim 1, wherein said cavity is a dielectric cavity.

12. The device according to claim 1, wherein said cavity comprises a metal.

13. The device according to claim 12, being devoid of any dielectric resonator between said crystal and in internal wall of said cavity.

14. The device according to claim 1, being a frequency source, and having an optical port receiving said pump beam, and an output port for emitting an output beam generated within said cavity.

15. The device according to claim 1, being a quantum amplifier, and having an optical port receiving said pump beam, a microwave port receiving an input microwave which passes through the inverted population and is amplified, and an output port through which said amplified microwave is emitted.

16. A radar, comprising device according to claim 1.

17. A communication system, comprising device according to claim 1.

18. A system for detecting a quantum state of a photon, comprising
an optical system having a first optical path and a second optical path and being configured to receive said photon and direct it to one of said optical paths;
wherein each of said optical paths comprises:
a device according to claim 15 for amplifying a photon propagating in said respective optical path, thereby providing a multiplicity of photons each having the same quantum state; and
a detector for detecting said multiplicity of photons, thereby detecting the state of the photon.

19. A method of quantum mechanically amplifying a signal, comprising directing said signal to the device of claim 1, and directing a pump light beam to said crystal, thereby quantum mechanically amplifying the signal.

20. The device according to claim 1, wherein said cavity contains two spaced apart crystals, wherein said light source is configured to direct said pump light beam directed to a gap between said crystals, and wherein the device further comprises a microwave input port, laterally displaced from said crystals.

* * * * *